United States Patent
Rao et al.

(10) Patent No.: US 10,491,309 B1
(45) Date of Patent: Nov. 26, 2019

(54) METHODS AND APPARATUS FOR FREE-SPACE UNDERSEA COMMUNICATIONS

(71) Applicant: Massachusetts Institute of Technology, Cambridge, MA (US)

(72) Inventors: Hemonth Rao, Lexington, MA (US); Andrew Fletcher, Westford, MA (US); Scott Hamilton, Lexington, MA (US); Nicholas Hardy, Wellesley, MA (US); Marvin Scheinbart, Chelmsford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 338 days.

(21) Appl. No.: 15/424,747

(22) Filed: Feb. 3, 2017

(51) Int. Cl.
*H04B 10/80* (2013.01)
*H04B 10/079* (2013.01)
*H04B 10/564* (2013.01)
*H04B 10/00* (2013.01)

(52) U.S. Cl.
CPC .......... *H04B 10/80* (2013.01); *H04B 10/079* (2013.01); *H04B 10/22* (2013.01); *H04B 10/564* (2013.01)

(58) Field of Classification Search
CPC .... H04B 10/80; H04B 10/508; H04B 10/532; H04B 13/02; H04B 10/2575; H04B 10/564; H04B 10/50; H04B 27/2697; H04B 10/12; H04B 10/00; H04B 10/588; H04B 10/61; H04L 27/26; H04L 27/2601; H04L 27/2697

USPC .......... 398/104, 125, 122, 212, 26, 119, 129
See application file for complete search history.

(56) References Cited

U.S. PATENT DOCUMENTS

| | | | | |
|---|---|---|---|---|
| 4,995,101 A | * | 2/1991 | Titterton | H04B 10/11 342/45 |
| 5,394,410 A | * | 2/1995 | Chen | H04L 1/08 714/823 |
| 7,616,888 B2 | * | 11/2009 | Mendenhall | G01S 7/4802 250/343 |

(Continued)

OTHER PUBLICATIONS

Arnon et al., "Underwater optical wireless communication network," Optical Engineering, vol. 49, No. 1, 6 pages (Jan. 2010).
(Continued)

*Primary Examiner* — Abbas H Alagheband
(74) *Attorney, Agent, or Firm* — Smith Baluch LLP

(57) ABSTRACT

A multi-rate, burst-mode, photon-counting receiver can communicate at data rates up to 10.416 Mb/s over a 30-foot water channel. With added attenuation, the maximum link loss is 97.1 dB at $\lambda=517$ nm. In clear ocean water, this equates to link distances up to 148 meters. For $\lambda=470$ nm, the achievable link distance in clear ocean water is 450 meters. The receiver incorporates soft-decision forward error correction (FEC) that supports multiple code rates to achieve error-free performance. A burst-mode receiver architecture provides robust performance with respect to unpredictable channel obstructions. The receiver can detect the data rate on-the-fly and adapts to changing levels of signal and background light. The receiver updates its phase alignment and channel estimates every frame, allowing for rapid changes in water quality as well as motion between transmitter and receiver.

18 Claims, 16 Drawing Sheets

(56) References Cited

U.S. PATENT DOCUMENTS

| | | | |
|---|---|---|---|
| 8,831,439 B2* | 9/2014 | Wu | H04B 10/2575 398/183 |
| 10,256,918 B2* | 4/2019 | Harris | H04B 10/07953 |
| 2013/0236171 A1* | 9/2013 | Saunders | H04B 10/70 398/26 |
| 2014/0341584 A1* | 11/2014 | Hopewell | H04B 10/80 398/104 |
| 2015/0016827 A1* | 1/2015 | Wilkinson | H04B 10/548 398/183 |
| 2015/0098705 A1* | 4/2015 | Motley | H04B 10/80 398/104 |
| 2016/0095559 A1* | 4/2016 | Gagnon | A61B 6/4241 600/425 |
| 2016/0248522 A1* | 8/2016 | Poirier | H04B 10/80 |
| 2017/0257173 A1* | 9/2017 | Harris | H04B 10/07953 |
| 2018/0123611 A1* | 5/2018 | Dutton | G01J 1/44 |
| 2019/0141612 A1* | 5/2019 | Takeda | H04B 7/063 |

OTHER PUBLICATIONS

Arnon, S. and Kedar, D., "Non-line-of-sight underwater optical wireless communication network," *J. Opt. Soc. Am. A*, 26(3) 530-539 (2009).

Baghdady et al., "Multi-gigabit/s underwater optical communication link using orbital angular momentum multiplexing," Optics Express, vol. 24, No. 9, 12 pages, (May 2, 2016).

Boroson, D.M., Scozzafava, J.J., Murphy, D.V., Robinson, B.S., and Shaw, H., "The Lunar Laser Communications Demonstration (LLCD)," SMC-IT 2009 Jul. 19-23, 2009 23-28 (2009).

Brundage, H., "Designing a wireless underwater optical communication system," Master's thesis, Massachusetts Institute of Technology, 69 pages (2010).

Caplan et al., "Demonstration of 2.5-Gslot/s optically-preamplified M-PPM with 4 photons/bit receiver sensitivity," OFC/NFOEC 2005 paper PDP32, 3 pages (2005).

Cochenour, B., Mullen, L., and Laux, A., "Phase coherent digital communications for wireless optical links in turbid underwater environments," Oceans 2007, 5 pages, Sep. 29-Oct. 4, 2007.

Farr, N., Bowen, A., Ware, J., and Pontbriand, C., "An integrated, underwater optical/acoustic communications system," Oceans 2010, 6 pages, May 24-27, 2010.

Grein et al., "Demonstration of a 1550-nm Photon-Counting Receiver with < 0.5 Detected Photon-Per-Bit Sensitivity at 187.5 Mb/s," CLEO/QELS 2008, paper CWN5, 2 pages (2008).

Hanson, F. and Radic, S., "High bandwidth underwater optical communication," *Applied Optics*, 47(2) 277-283 (2008).

Hiskett et al., "A photon-counting optical communication system for underwater data transfer," Proc. of SPIE, vol. 8542, 16 pages (2012).

Hiskett, P.A. and Lamb, R.A., "Underwater optical communications with a single photon-counting system," Proc. SPIE 9114, 15 pages (2014).

Krainak, M., Unger, G., and Sun, X., "High-sensitivity 1064-nm 50-Mbps direct-detection free-space communications receiver," CLEO 1992, paper CThl16, 2 pages (1992).

MacKay, "Good Error-Correcting Codes Based on Very Sparse Matrices," IEEE Transactions of Information Theory, vol. 45, No. 2, pp. 399-431 (Mar. 1999).

Mendinueta et al., "Digital dual-rate burst-mode receiver for 10G and 1G coexistence in optical access networks," *Optics Express* 19(15) 14060-14066 (2011).

Oubei et al., "2.3 Gbit/s underwater wireless optical communications using directly modulated 520nm laser diode," Optics Express, vol. 23, No. 16, 6 pages, (Aug. 10, 2015).

Oubei et al., "4.8 Gb/s 16-QAM-OFDM transmission based on compact 450-nm laser for underwater wireless optical communication," *Optics Express*, 23(18) 23302-23309 (2015).

Petzold, T.J., "Volume scattering functions for selected ocean waters," Scripps Institute of Oceanography SIO 72-78, 83 pages (1972).

Pontbriand, C., Farr, N., Ware, J., Preisig, J., Popenoe, H., "Diffuse high-bandwidth optical communications," Oceans 2008, Sep. 15-18, 2008.

Quirk et al., "Optical PPM Demodulation From Slot-Sampled Photon Counting Detectors," IEEE Military Communications Conference, IEEE Computer Society, pp. 1634-1638, (2013).

Quirk et al., "Optical PPM Detection with Sample Decision Photon Counting," IEEE Blocecom, pp. 148-151, (2005).

Quirk et al., "Optical PPM Synchronization for Photon Counting Receivers," IEEE, 7 pages (2008).

Rao et al., "A Burst-Mode Photon-Counting Receiver with Automatic Channel Estimation and Bit Rate Detection," Proc. of SPIE, vol. 9739, 12 pages (2016).

Robinson et al., "781 Mbit/s photon-counting optical communications using a superconducting nanowire detector," *Optics Letters*, 31(4) 444-446 (2006).

Snow et al., "Underwater propagation of high data rate laser communication pulses," Proc. SPIE 1750 419-427 (1992).

Spellmeyer et al., "Demonstration of a multi-rate thresholded preamplified 16-ary pulse-position-modulation," OFC/NFOEC 2010 paper OThT5, 3 pages (2010).

Srinivasan et al., "A Post-Processing Receiver for the Lunar Laser Communications," Proc. of SPIE, vol. 8610, 9 pages, (2013).

* cited by examiner

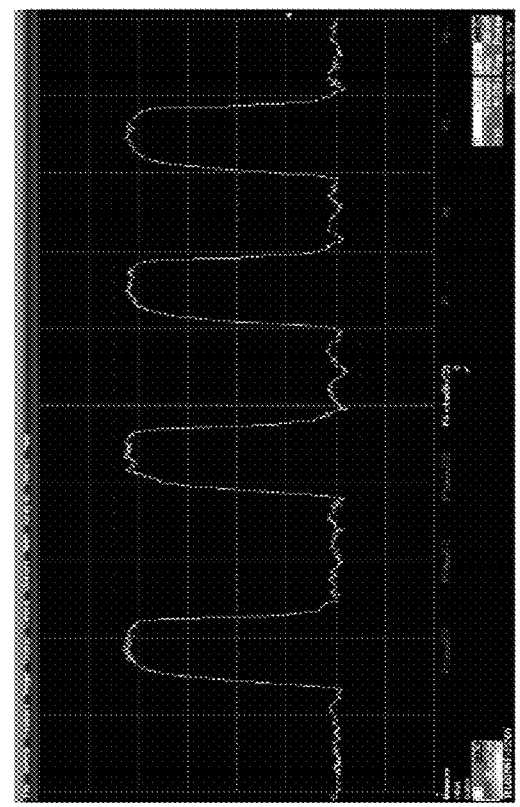
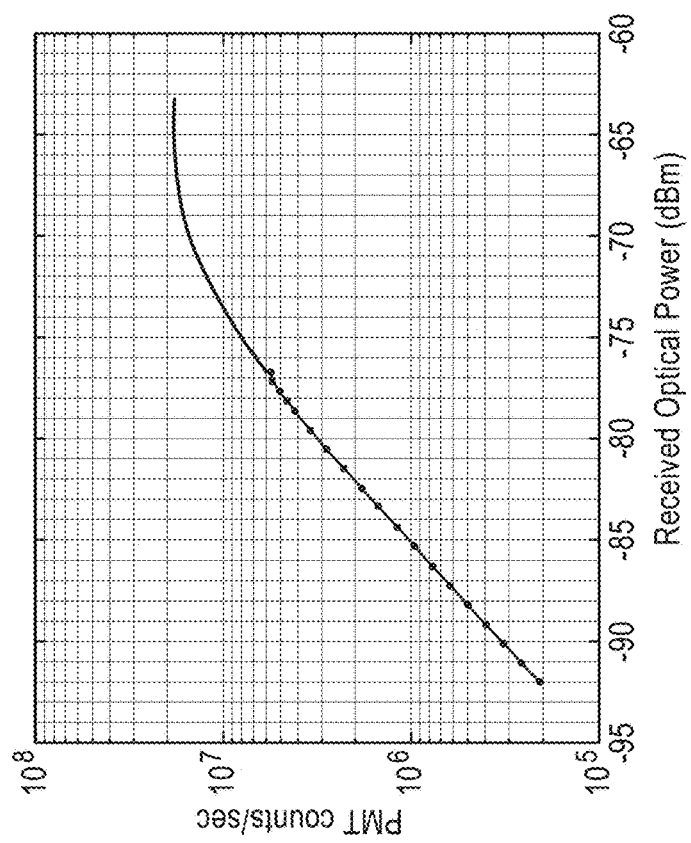
FIG. 3A
FIG. 3B

METHODS AND APPARATUS FOR FREE-SPACE UNDERSEA COMMUNICATIONS

GOVERNMENT SUPPORT

This invention was made with Government support under Contract No. FA8721-05-C-0002 awarded by the U.S. Air Force. The Government has certain rights in the invention.

BACKGROUND

Underwater wireless optical communication promises to increase data rates beyond those practically achievable using acoustics, with link lengths potentially extending to hundreds of meters. But compared to atmospheric or space-based wireless optical communication, underwater communication faces unique challenges. The absorption spectrum of water dictates that the communication wavelength should be blue or green, rather than the infrared wavelengths used in air and space links. And scattering over short distances in water transfers significant energy outside the beam's diffraction-limited divergence profile, which limits the usefulness of single-mode fiber components at the receiver. Together, absorption and scattering make it challenging to apply some of the technologies (e.g., erbium-doped fiber amplifiers or EDFAs) used in high data rate air and space wireless optical links to underwater wireless optical communication.

In addition, water quality can significantly affect attenuation caused by absorption and scattering. Whereas diffraction-limited air and space links experience attenuation primarily as the inverse-square of distance, loss due to water absorption and scattering is dominated by the Beer-Lambert law:

$$I(z) = I(0)e^{-cz} = I(0)e^{-(a+b)z} \quad (1)$$

where a and b represent absorption and scattering coefficients, respectively, c is the overall loss due to the both effects, and z is distance. TABLE 1 (below) shows that the characteristic values for these coefficients vary widely for different several water types. Because of the wide variation in optical loss with water type and optical wavelength, it is useful to measure link distance in terms of extinction lengths, where an extinction length is $c^{-1}$.

Scattering at any given location is subject to seasonal variation as suspended biological matter becomes more or less prevalent. Furthermore, scattered sunlight contributes to background noise. Therefore, background noise is subject to variations in water quality, available sunlight at depth, receiver pointing angle, overhead clouds, and time of day.

As can be seen from TABLE 1, signal attenuation over a realistic 10 meter green-light link can vary between 6.6 dB (clear ocean) and 95.5 dB (turbid harbor). Similarly, large variations in link loss can occur for a particular water type if the distance between communicating terminals is changing. Faster changes that could result in deep signal losses (i.e., fades) can be caused by bubbles, turbulence, or large agents, such as fish that appear in the path of the signal.

To compensate for fluctuations in link loss due to changes in link conditions, it is usually necessary to vary the data rate and code rate of the transmitted signal. (At the extreme, it may be necessary to stop transmitting until the link loss drops to acceptable levels.) Typically, these changes must be pre-announced between transmitter and receiver, negotiated within the optical channel using an in-band control channel, or negotiate via a more-reliable side channel. Unfortunately, pre-announced changes are impractical for underwater communications because there aren't any good models of how link loss fluctuates in underwater channels. In-band negotiation is problematic too. If the information rate needs to be reduced because of link impairments, it implies that the link is not reliable enough for the in-band channel to negotiate the change. Out-of-band negotiation using a side channel is also unattractive. In the underwater environment, the most obvious candidate for out-of-band communication is an acoustic channel. However, the acoustic link requires extra hardware. Furthermore, the acoustic signal is much less spatially confined than the optical signal. This spreading is undesirable from an environmental perspective.

SUMMARY

Embodiments of the present invention include a burst-mode, photon-counting receiver that automatically determines channel rate and forward error correction (FEC) code rate without the need for negotiation with the transmitter. The receiver's synchronization system provides periodic updates of the incoming data's estimated clock phase, as well as estimates of the signal and background light levels. Light level estimates are used to generate soft-decision information on a bit-by-bit basis for use by the receiver's

TABLE 1

Absorption, scattering, and loss for various water type at different wavelengths.
Parameters: a = absorption, b = scattering, c = a + b, EL = extinction length = $c^{-1}$.

| Water Types | λ | a [m$^{-1}$] | b [m$^{-1}$] | c [m$^{-1}$] | EL | Source |
|---|---|---|---|---|---|---|
| Turbid Harbor | 514 nm (green) | 0.37 | 1.8 | 2.2 | 0.45 m | Petzold, T.J., "Volume scattering functions for selected ocean waters," Scripps Institute of Oceanography SIO 72-78 (1972) |
| Clear Ocean | 514 nm (green) | 0.11 | 0.037 | 0.15 | 6.7 m | Petzold, T.J., "Volume scattering functions for selected ocean waters," Scripps Institute of Oceanography SIO 72-78 (1972) |
| | 470 nm (blue) | 0.038* | 0.012* | 0.05 | 20 m | Pontbriand, C., Farr, N., Ware, J., Preisig, J., Popenoe, H., "Diffuse high-bandwidth optical communications," OCEANS 2008, 15-18 September 2008. |

*Assumed same ratio of b/c as Petzold's clear ocean case.

FEC system. Examples of this receiver can be used for undersea optical communication and in other types of optical networking, including fiber passive optical networks (PONs), communication systems for unmanned vehicles, and wearable communication systems.

An example optical receiver comprises a photon-counting detector, a boundary detector operably coupled to the photon-counting detector, at least one alignment block operably coupled to the boundary detector, and a rate decision block operably coupled to the alignment block(s). In operation, the photon-counting detector transduces an optical signal with a variable data rate into a digital signal including a symbol having a data period and a guard period. The boundary detector senses a boundary (e.g., a rising or falling edge) of the digital signal. This boundary indicates a photon arrival at the photon-counting detector. The alignment block estimates a number of photons detected by the photon-counting detector during the guard period at each of a plurality of predetermined data rates based on the boundary of the digital symbol. And the rate decision block estimates the variable data rate of the optical signal based on the number of photons detected by the photon-counting detector during the guard period at each of the plurality of predetermined data rates.

In some cases, the photon-counting detector receives the optical signal via a turbid underwater channel. The photon-counting detector may sample the optical signal at a rate greater than a reciprocal of a duration of the guard period. And the photon-counting detector may have a reset period that is less than the duration of the guard period.

The alignment block may estimate a number of signal photon arrivals during the data period and a number of noise photons arrivals during the guard period. In these cases, the optical receiver may identify a symbol in the digital signal based at least in part on the number of signal photon arrivals and the number of noise photons arrivals.

The rate decision block may estimate one of the plurality of predetermined data rates as the variable data rate. In some cases, the rate decision block may estimate the variable data rate of the optical signal for each symbol in the digital signal.

The optical receiver may also include a log-likelihood ratio block that is operably coupled to the rate decision block and that computes a log-likelihood ratio based on the boundary of the digital symbol. And the optical receiver can include a delay block that is operably coupled to the photon-counting detector and a decoder that is operably coupled to the delay block and the rate decision block. The delay block delays a copy of the symbol, and the decoder decodes the copy of the symbol at the variable data rate estimated by the rate decision block. The decoder may also estimate a forward error correction (FEC) code rate of the digital signal.

Another example optical receiver comprises a photon-counting detector, a processor operably coupled to the photon-counting detector, and a decoder operably coupled to the processor. In operation, the photon-counting detector transduces a digital optical signal received via a turbid underwater channel into a digital electronic signal. Each symbol in the digital optical signal includes an off period greater than a reset period of the photon-counting detector and greater than a sampling period of the photon-counting detector. The processor estimates, for each symbol in the digital electronic signal, a data rate of the digital electronic signal based on the off period of the corresponding symbol in the digital optical signal. This data rate is one of a predetermined plurality of data rates. And the decoder decodes each symbol in the digital electronic signal at the corresponding data rate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A is a plot of photomultiplier tube (PMT) count linearity versus input power.

FIG. 3B is a plot of the PMT output for high input power.

DETAILED DESCRIPTION

Burst-Mode, Photon-Counting Receivers with in-Band Control

The apparatus and methods disclosed herein allow high-sensitivity, point-to-point, and multi-user photon-counting optical communication in real time with near-theoretical performance in extremely challenging environments, including in turbid water. In particular, examples of the receivers disclosed herein can automatically adapt to unannounced changes in the data rate of the incoming signal as well as unannounced changes in the forward error correction (FEC) code rate. Accommodating unannounced changes in the data and code rates allows robust operation when optical link loss is high, high speed when the link loss is low, and operation when the link loss fluctuates unexpectedly.

Automatic data and code rate adaptation at the receiver reduces or also removes the need for a parallel management channel between the transmitter and receiver to negotiate data rate and code rate. This is especially advantageous in environments where the management channel is not fast enough, reliable enough, or practical to implement. It also simplifies the receiver and reduces the system's size, weight, and power consumption by eliminating the components used to implement the management channel.

An example receiver can be implemented as a burst-mode receiver that employs a photon-counting detector. Thanks to the photon-counting detector, this receiver can support communication both over longer distances with higher loss and over moderate distances with lower transmitter power. In addition, it can handle maximally-bounded time periods of high signal loss, called fades, of arbitrary duration as well as steady-state operation. Furthermore, as a burst-mode receiver, it enables minimal link setup and teardown time. This enables multi-user communication among a network of receivers.

Combining in-band control and rate adaptability, photon counting, and burst-mode operation yields the ability to handle increased data rates and wider variations in link loss. For instance, the inventors have demonstrated approximately one order of magnitude in data rate and link loss variation has been demonstrated with no loss of signal efficiency. And this demonstration can be extended to accommodate three orders of magnitude in data rate and link loss variation.

Conversely, prior photon-counting links are designed for quasi-static operation, where the controllable operational parameters (data rate, FEC code rate, etc.) are known beforehand and changed slowly. These prior photon-counting have simplified their implementations by employing a side-channel to coordinate setup of the operational parameters. As such, they are ill-equipped for rapid changes in data rate and code rate, which restricts the range of optical link losses to which they can adapt over short time periods.

Underwater Wireless Optical Communications Network

Figure 1:
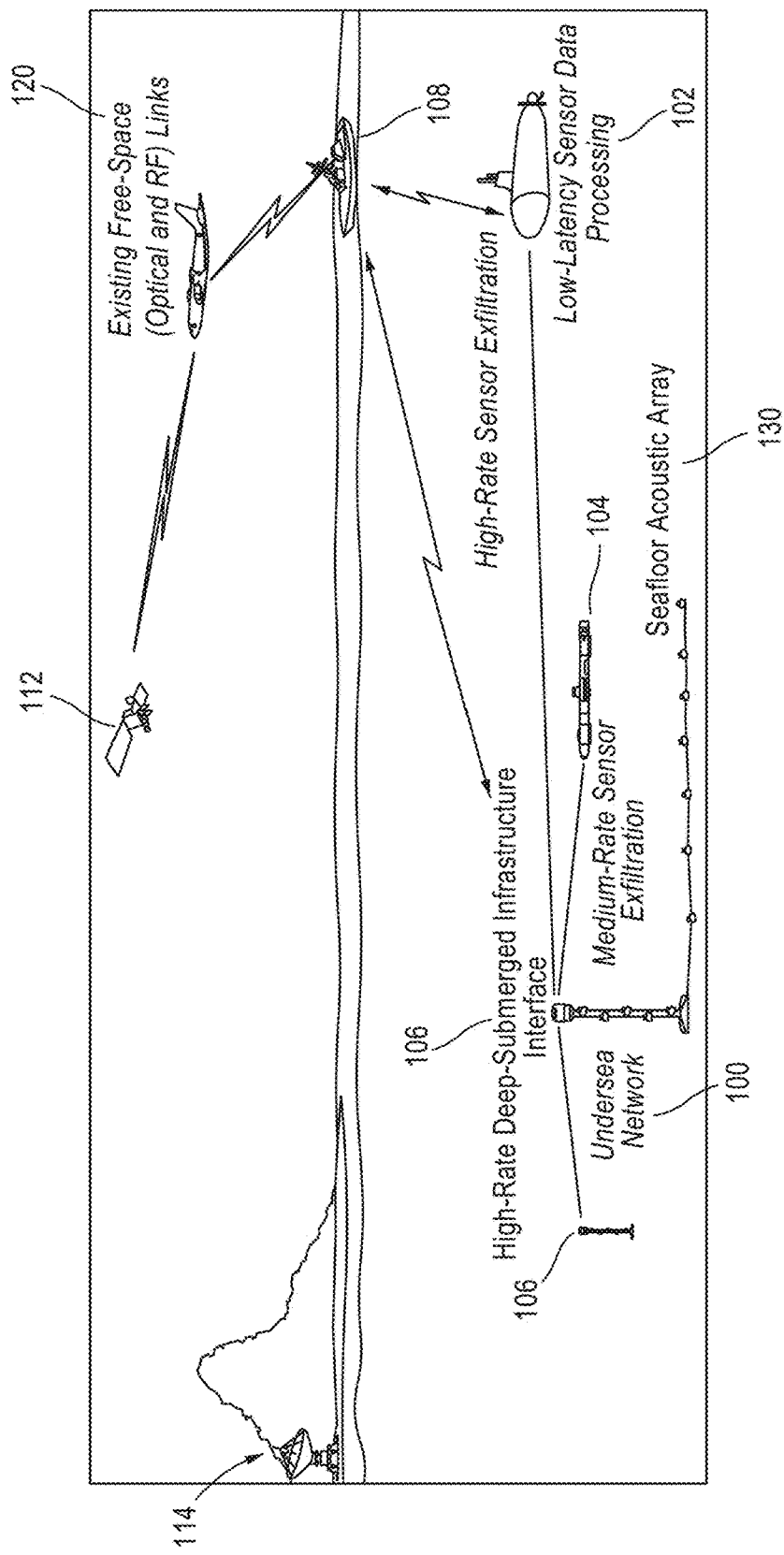
FIG. 1 shows an underwater optical communication system.

FIG. 1 shows an underwater wireless optical communications network 100 for communications among a variety of submerged platforms, including a submarine 102, a unmanned underwater vehicle (UUV) 104, and several high-rate, deep-submerged infrastructure interfaces 106. These platforms can also communicate with surface vessels, such as a ship 108, via the underwater optical communications link. The ship 108, in turn, may communicate with aircraft 110, satellites 112, and ground stations 114 via existing optical and radio-frequency links 120. Likewise, the deep-submerged infrastructure interfaces 106 may connect the underwater wireless optical communications network 100 with a seafloor acoustic array 130 and other acoustic for both passive acoustic sensing and underwater acoustic communication.

Each platform connected to or forming part of the underwater wireless optical communications network 100 can include a transmitter and receiver for two-way communication. (Some platforms may have only a transmitter or a receiver, not both, and be configured for one-way communication.) As described in greater detail below, each transmitter can transmit a laser beam modulated with a rate determined in part by the desired data transmission rate and the link loss between the transmitter and the receiver. This data rate is a member of a set of possible data rates that is discrete, finite, pre-determined, and known to both transmitter and receiver. The transmitter may switch among data rates in the set of possible data rates during the transmission, e.g., in response to variations in the link loss caused by fish, turbidity, sediment, distance variations between the transmitter and receiver, and other environmental perturbations. The transmitter may also vary the FEC code rate as well. In some cases, the transmitter may change the data and FEC code rates at every frame in the transmitted signal.

The receiver detects the transmitted signal, determines the data and FEC code rates on a frame-by-frame basis, and uses the detected rates to decode the signal. In some cases, the receiver estimates the channel (e.g., the signal and background levels) faster than the code rate. For example, at a (highest) data rate of 10.416 Mb/s, the receiver may re-estimate the channel every 16384 bits. At a (lowest) data rate of 1.302 Mb/s, the receiver re-estimates the channel every 2048 bits. In this example, the frame itself is longer at 65856 bits. This enables the transmitter and receiver to stay connected even when the link loss fluctuates wildly during the transmission. If the loss is too high (e.g., because a fish is in between the transmitter and receiver), however, the system may simply stop transmitting until the loss falls to acceptable levels.

The system can respond to link loss fluctuations with a speed that depends on the integration time W which represents the number of samples or slots as discussed below with respect to FIG. 9A. For example, in the implementation described below, the slot period is 4 ns. The integration period W=(24 slots per bit at a data rate of 10.416 Mb/s)× (16384 bits)×(4 ns)=1.57 ms. So, in this example, the receiver expects the channel to be roughly constant for about 1.57 ms. Shortening this integration time allows the receiver to handle faster fluctuations in the channel loss. On the other hand, a shorter integration time can yield noisier estimates.

In some cases, the link loss may range from almost nothing to roughly 100 dB. The ability to support on-the-fly changes in data and FEC code rates also allows the link to tolerate and adapt to a range of background light levels. The link can be designed to vary its data rate according to changes in link quality, allowing high data rates in the presence of low loss and low background, and robust communications in the presence of low light or high noise. As a result, the link can operate with robust data transmission and reception at the highest rate supported by the channel.

Underwater Wireless Optical Link Testbed

Figure 2:
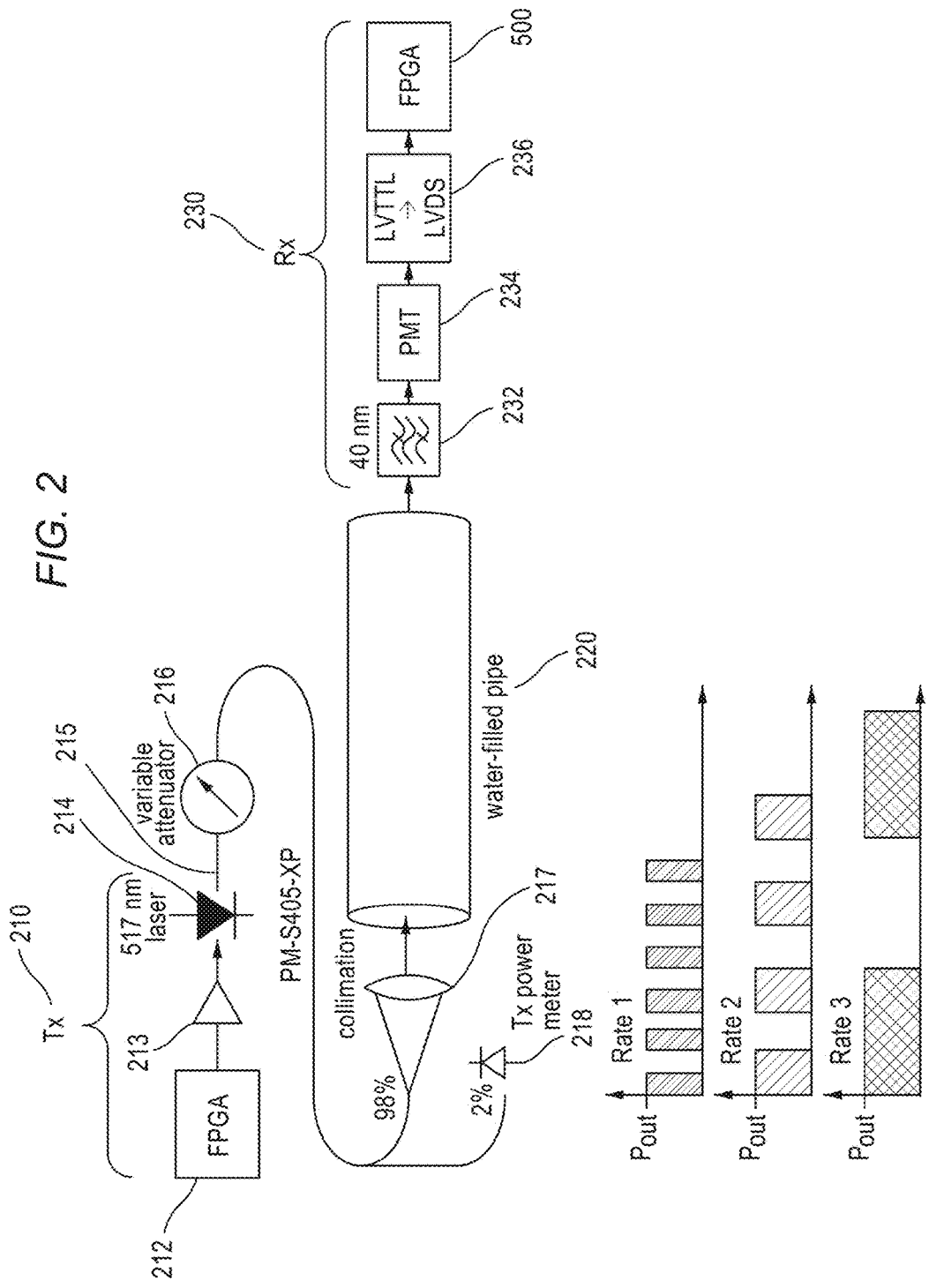
FIG. 2 shows a testbed for a link suitable for use in the underwater optical communication system of FIG. 1.

FIG. 2 shows an experimental testbed 200 used to demonstrate communication via a uni-directional underwater link. This underwater link could form one of the links in the underwater optical communications network 100 shown in FIG. 1. The testbed includes an underwater channel (here, a water-filled pipe 220), a transmitter 210 at one end of the pipe 220, and a receiver 230 at the other end of the pipe 220. In operation, the transmitter 210 emits a free-space, digitally modulated optical signal that propagates through the water in the pipe 220 to the receiver 230, which transduces the optical signal into a digital electronic signal.

The transmitter includes a processor 212 coupled to an amplifier 213, which is in turn coupled to a laser 214. The processor 212, shown here as a field-programmable gate array (FPGA), generates a variable-rate digital electronic signal that is amplified by the amplifier 213. The amplifier 213 drives the laser 214 directly with an amplified version of the variable-rate electronic digital signal to produce a variable-rate digital optical signal that is launched into an optical fiber 215. Here, the laser emits light at a wavelength of 517 nm, but other embodiments may emit at other wavelengths in the blue-green portion of the visible spectrum (e.g., 470 nm, 514, nm, etc.). An optional fiber-coupled variable attenuator 216 attenuates the optical signal, which is collimated and launched into the pipe 220 via a collimating lens 217. Two percent of the fiber output is read with a power meter 218 to determine power at the launch end of the pipe 220.

For example, the processor 212 can be implemented as a Xilinx Virtex 7 field-programmable gate array (FPGA) board. The laser's wavelength is 517 nm with an approximate 1 nm bandwidth. It supports an output power of 100 mW and modulation up to 250 MHz. The laser 214 provides extinction greater than 30 dB. The laser's output is fiber-coupled to a 10-meter length of Nufern polarization-maintaining PM-S405-XP fiber 215. Most of this fiber's output is collimated and launched into the water pipe. For reasons of environmental safety and to reduce size and complexity, the transmitter output power may range from 10 mW to 100 mW. If the beam emitted by transmitter propagates through 10 meters of turbid water in a harbor and neglecting beam-spreading loss, the optical power at the receiver should be about −85.5 dBm to −75.5 dBm.

The pipe 220 can be filled with filtered tap water, emptied into a reservoir (not shown), and cleaned of biological agents with UV light. If desired, controlled scattering agents can be added to the pipe. The pipe itself is opaque at the transmitter's wavelength and is sealed at both ends to keep out stray light. In this testbed 200, the launch power into the water pipe is 13 dBm (20 mW) and the optical loss through the pipe is 8 dB. If desired, additional loss is introduced via the optical attenuator 216.

The receiver 230 includes an optical passband filter 232, a photon-counting detector (e.g., a Hamamatsu H10682-210 photomultiplier tube (PMT) 234), and level converter 236, and processor 500 (e.g., a Xilinx Virtex 7 FPGA board containing a single XC7VX485T FPGA) 300. In this case, the PMT 234 is a single-element detector operated at room temperature that has a measured quantum efficiency of 0.1274, a maximum dark count rate of 100 s$^{-1}$, an output pulse width of 8 ns, and a dead time of 20 ns. For continuous wave (CW) input light, its output is very linear with input power up to approximately 3 Mcounts/s; for higher input powers, the count rate deviates until it saturates at approximately 18.3 Mcounts/s (see below).

The optical passband filter 232 transmits light at the wavelength emitted by the transmitter 210 and rejects light at other wavelengths. The PMT 234 transduces the photons transmitted by the filter 232 into a low-voltage transistor-transistor logic (LVTTL) electrical signal suitable for electronic demodulation and processing. The level converter 236 is dc-coupled to the PMT's output and converts the LVTTL electrical signal into a low-voltage differential signaling (LVDS) electric signal suitable for processing by the FPGA 300. And the FPGA samples the PMT output at a rate higher than the highest possible data rate—in this example, at 500 Msamples/s—as explained in greater detail below.

Because this receiver 230 uses a photon-counting detector, the front-end processing can be performed entirely in the digital domain, e.g., with the FPGA 400. Previous burst-mode receivers require a mixed-signal front end to quantize the incoming signal for optimum performance. In some instances, an analog-to-digital converter is required; in other cases, a comparator with a variable threshold set according to the average signal strength is needed. These components add to the size, weight, and power of the receiver and are not necessary for the receiver 230 shown in FIG. 2.

FIGS. 3A and 3B are plots that illustrate performance of an example PMT for use in the receiver 230 of FIG. 2. FIG. 3A shows the PMT output in photon counts per second versus optical input power. And FIG. 3B is an oscilloscope trace showing an example of the PMT output for a sequences of optical pulses with high input power. The last two pulses show both the pulse width and blocking time.

Another example of the receiver may include both a photon-counting detector (e.g., a PMT) for signals near the minimum expected signal level and a linear avalanche photodiode (APD) for higher data rates and higher signal powers. The combination of both detectors allows operation over the full dynamic range. For the photon-counting receiver, as for a linear APD, a desirable figure of merit for efficient rate fallback is near-theoretical performance in terms of required photons per bit for a given modulation format and for a given bit error rate (BER).

Modulation Scheme and Transmitted Waveform

Figure 4A:
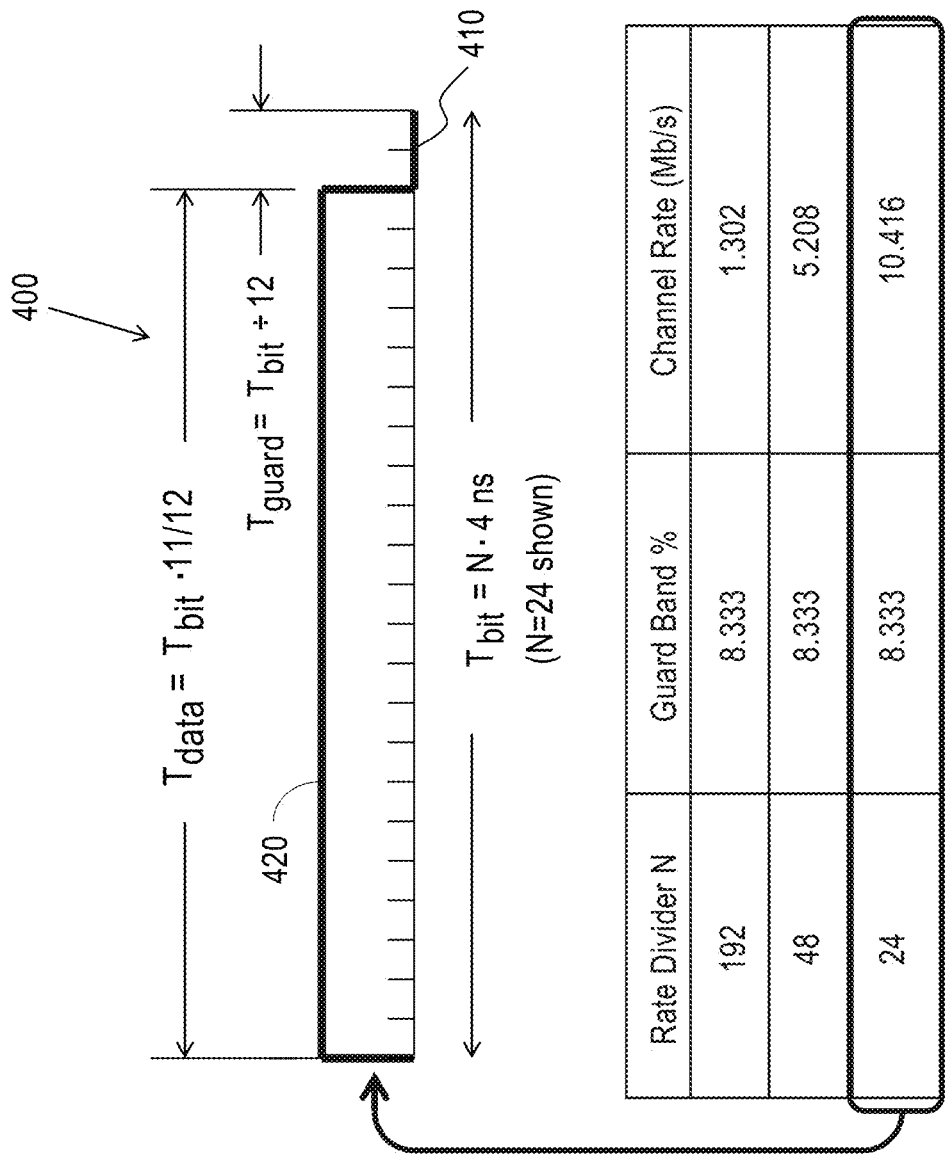
FIGS. 4A and 4B show an on-off keying (OOK) modulated frame suitable for transmission and reception via the link shown in FIG. 2.
Figure 4B:
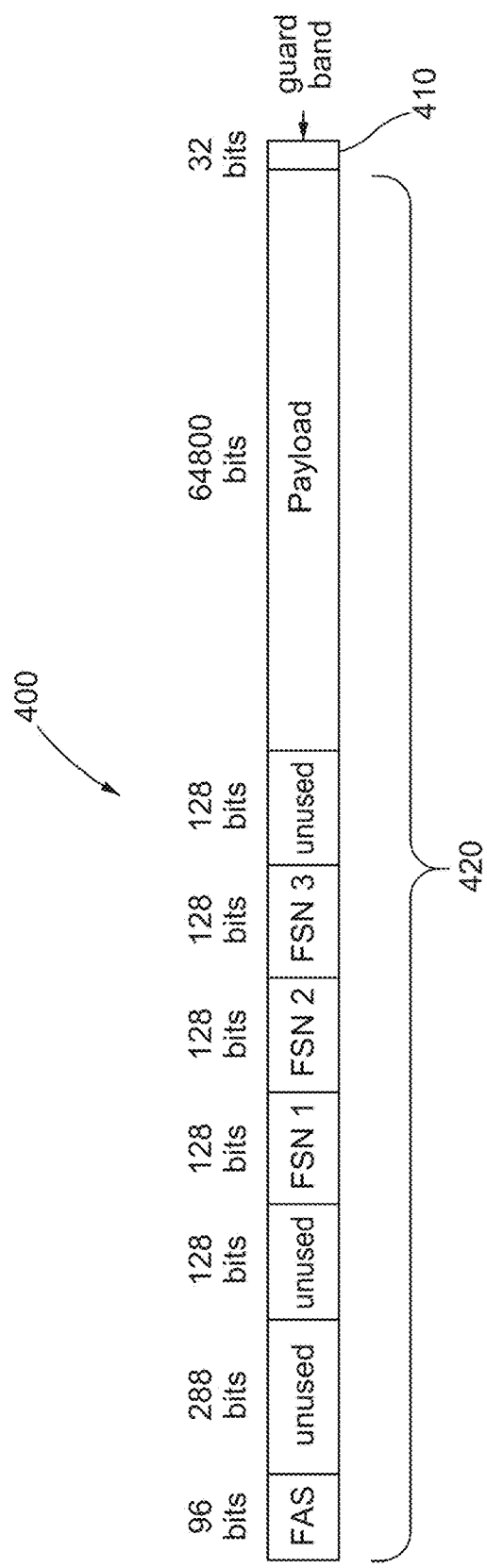

FIGS. 4A and 4B illustrate a bit and a frame, respectively, in the waveform transmitted and received via the link shown in FIG. 2. The link bandwidth is limited by the bandwidth of the single-element PMT, so the transmitter processor 212 modulates the laser 214 with on-off keying (OOK) modulation. (Other modulation schemes are also possible, including pulse-position modulation (PPM), which has been demonstrated with other photon-counting links.) Non-return to zero (NRZ) OOK does not have a clock frequency component, which complicates receiver synchronization, so the modulation imparted by the transmitter 210 and shown in FIGS. 4A and 4B is a high duty-cycle return-to-zero (RZ) format, which does have a clock frequency component. In OOK modulation shown here, rate fallback occurs by lengthening the symbol duration.

FIG. 4A shows the amplitude of a frame 400 with a total duration of 96 ns, which corresponds to a channel rate of 10.416 Mb/s. As explained above, the transmitter may increase or decrease the data rate and frame length depending on the channel loss, amount of data to be transmitted, response from the receiver, receiver clock rate, etc. For instance, the transmitter may decrease the data rate to 1.302 Mb/s, which corresponds to a total frame duration of 768 ns, or to 5.208 Mb/s, which corresponds to a total frame duration of 192 ns. Those of skill in the art will readily appreciate that other data rates and frame durations are also possible.

FIGS. 4A and 4B show that, regardless of the data rate/frame duration, the frame 400 includes both a data-bearing portion 420 and a guard period 410, also called a guard interval, gap, off period, or off time, with a duty cycle in this case of 1/12 (8.333%). (Other duty cycles are also possible, bearing in mind the constraints on the absolute duration of the guard period 410 discussed below.) The transmitter varies the absolute duration of the guard period 410 so that this duty cycle remains constant regardless of the data rate/frame duration. (The transmitter can also fix the guard period duration and vary the duty cycle.) In the example of FIGS. 4A and 4B, for instance, the duration of the guard period 410 is 8 ns at the highest data rate (10.416 Mb/s), 16 ns at the middle data rate (5.208 Mb/s), and 64 ns (1.302 Mb/s). Regardless of the data rate, the guard period 410 has a duration that is long enough to be sampled at least twice by the receiver.

The guard period duration may also be longer than the reset period of the PMT, which may about 20 ns. In the case shown in FIGS. 4A and 4B, the guard period duration is longer than the PMT reset period at the lowest data rate. Neglecting dark counts, this ensures that the PMT has enough time to reset before the next photon (i.e., the first photon of the next frame) arrives at the receiver. Even at the higher data rates, which have guard periods shorter than the PMT reset period, the guard period significantly improves the chance that the PMT is armed before the next frame starts.

FIG. 4B shows one way to organize the transmitted data into frames. Frame fields 422, 423, and 427 are unused and reserved for future development. A 96-bit Frame Alignment Sequence (FAS) 421 at the beginning of the frame 400 is a fixed pattern used to delimit the start of each frame 400. Each frame 400 is numbered at the transmitter with a Frame Sequence Number (FSN), which is encoded into a 127-bit BCH (127,22) codeword, padded to 128 bits, and repeated three times (424, 425, and 426) within the frame. At the receiver, the three copies are combined into one by performing a bit-by-bit vote, otherwise known as triple-mode redundancy (TMR). TMR improves robustness by ensuring that the FSN can be decoded at higher BER than the payload 428.

The payload 428 is a $2^{16}-1$ pseudo-random bit stream (PRBS) encoded using a low-density parity check (LDPC)+BCH product code. The PRBS sequence restarts with each frame. The FEC codec implementation runs in real time on the receiver processor (FPGA). The decoder accepts a soft-decision input with 6-bit quantization of log-likelihood ratios (LLRs). It supports a wide range of code rates (1/4, 1/3, 2/5, 1/2, 3/5, 2/3, 3/4, 5/6, 8/9, and 9/10) that can be selected and changed by the transmitter processor during run-time.

The end of the frame 400 includes 32 bits of a fixed pattern of valid bits used to allow a gap (the guard period 410) between successive frames 400. For example, the fixed pattern may include 32 "1" bits, each of which is on during the data period and off during the guard period, according to the current data rate. If the fixed pattern is 32 "0" bits, then there should be no light transmitted. The exact pattern is not important, although all "0" bits (i.e., no photons during 32-bit gap) is the lowest-power option and therefore attractive for reducing energy consumption.

In burst-mode transmission, the receiver clock phase is nearly constant with respect to the transmitter over the duration of one frame. To account for the clock's possibly moderate stability, the receiver clock phase is allowed to drift slowly with respect to the transmitter clock phase. The inter-frame gap (guard period 410) of 32 bits is more than large enough to allow clock slips between frames and is a convenient size for this transmitter implementation.

Receiver Processor Implementation and Functions

Figure 5:
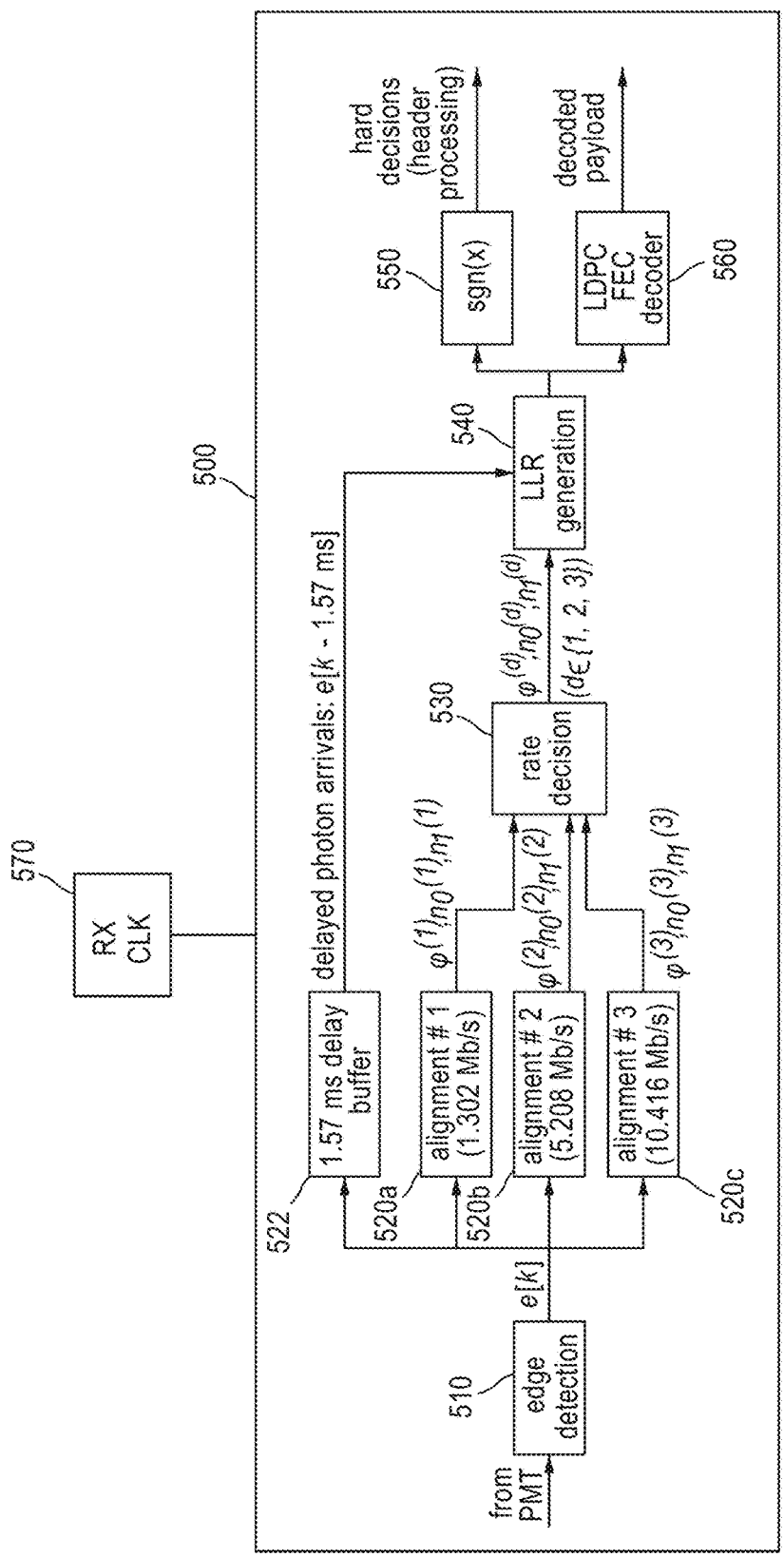
FIG. 5 shows a block diagram of a receiver processor suitable for use in the receiver shown in FIG. 2.

FIG. 5 shows a block diagram of the processor 500 and other components in the receiver 230 of FIG. 2. The processor 500 includes an edge detection block whose output is coupled in parallel to three alignment blocks 520a-520c (collectively, alignment blocks 520) and a first-in, first-out (FIFO) delay block 522. The outputs of the alignment blocks 520 are coupled to the input of a rate decision block 530, which in turn has an output coupled to a log-likelihood ratio (LLR) generation block 540. The LLR generation block 540, which also receives an input from the delay block 522, is coupled in parallel to a sign (signum) function block 550 and an FEC decoder 560. The processor 500 is also coupled to a receiver clock 570.

In operation, the processor 500 determines the data rate; estimates signal and background light levels; performs data clock alignment, demodulation, and LLR generation; and processes frame data continuously in real time. The edge detection block 510 at the processor's input receives individual PMT output pulses, each of which has a duration is significantly longer than the processor's sampling period, which in this case is set at 2 ns (sampling frequency of 500 Ms/s) by the receiver clock 570. Because the PMT output pulses are longer than the processor's sampling period, the edge detection block 510 registers PMT events as the rising edges of the PMT output.

The derived edges from the edge detection block 510 are fed to the three alignment blocks 520 and buffered in the delay block 522 (here, for 1.572864 ms). The delay implemented by the delay block 522 is the time period to perform alignment. This delay is expressed as the integration period W, which is equal to the product of the number of slots per bit, the slot period, and the number of bits per estimation period. In the following example, this delay is constant across all data rates, so the number of bits per estimation scales inversely with data rate. For instance, at a data rate of 10.416 Mb/s, there are 24 slots per bit at 4 ns per slot and 16384 bits per estimation period, which yields an integration period (buffer period) of about 1.57 ms. The free variable is how many bits per estimation period (here, 16384). This can be different in other implementations.

Each alignment block 520 corresponds to a supported channel data rate. As described below, each alignment block 520 assumes one of a number of predetermined data rates used by the transmitter (e.g., alignment block 520a assumes a data rate of 1.302 Mb/s, alignment block 520b assumes a data rate of 5.208 Mb/s, and alignment block 520c assumes a data rate of 10.416 Mb/s). The alignment block 520 for the $d^{th}$ channel rate derives an estimate $\varphi^{(d)}$ for a bit phase delay between the incoming stream e[k], which is a digital electronic signal representing photon arrivals detected by the PMT, and the receiver's own bit clock 570. It also estimates $n_0^{(d)}$ and $n_1^{(d)}$, which are the average number of background and signal photons per bit, respectively, for the $d^{th}$ data rate. (Put differently, $n_0^{(d)}$ is the average number of photons in a "0" bit and $n_1^{(d)}$ is the average number of photons in a "1" bit.) All three alignment blocks 520 are synchronized to start estimating at the same time, to report estimates together every 1.572864 ms, and to immediately start the next estimate. Thus, timing recovery can be viewed as an "integrate-and-dump" event occurring with a strict periodicity.

The alignment blocks 520 therefore perform channel estimation, which encompasses estimation or determination of (1) the data rate, (2) the bit alignment, (3) the average number of photons in a "1" bit, and (4) the average number of photons in a "0" bit. The average number of photons in a "1" bit doesn't differentiate between real signal photons and background photons that happened to show up in that bit—the average number of photons in a "1" bit is the sum of the numbers of photons from these two sources. And the average number of photons in a "0" bit should just be determined by background. If the transmitter's extinction is poor, however, then the average number of photons in a "0" bit may be equal to background photons plus light from the (off) transmitter.

The alignment blocks 520 report their estimates of $n_0^{(d)}$ and $n_1^{(d)}$ or just the ratio $n_1^{(d)}/n_0^{(d)}$ to the rate decision block 530, which decides on the incoming data rate depending on which alignment block 520 reports the highest value of the ratio $n_1/n_0$. The LLR block 540 uses the selected estimate for $\varphi$ to align the delayed edge data to the receiver's own bit clock 570. It also uses $n_0$ and $n_1$ to generate LLRs from the PMT rising edges. Assuming that the PMT rising edges are Poisson-distributed, the LLR for a given bit with n detected photons can be calculated as:

$$LLR = \ln\frac{p(1|n)}{p(0|n)} = \ln\frac{p(n|1)}{p(n|0)} = \ln\frac{e^{-n_1} \cdot n_1^n}{e^{-n_0} \cdot n_0^n} = n_0 - n_1 + n \cdot (\ln n_1 - \ln n_0)$$

The delay FIFO buffer 522 allows the PMT data to generate estimates for $\varphi$, $n_0$, and $n_1$ and then be processed with those same estimates. With the FIFO buffer 522, the channel delay, signal, and background light levels need only be quasi-static over approximately 1.6 ms; without the FIFO buffer 522, the channel would need to be stable for twice as long. Fortunately, the FIFO buffer 522 can be implemented using a small amount of FPGA block random access memories (BRAMs). It can also be implemented in external memory, although external memory is not required.

The signum block 550 detects the sign of the LLR for use in generating hard decisions. For a given bit with an LLR≥0, the corresponding hard decision is a "1". Otherwise, the hard decision is a "0". This implies an effective hard-decision threshold of $$n_{th} = \frac{n_1 - n_0}{\ln n_1 - \ln n_0}$$

Hard decisions are used to process the FAS and FSN fields of the frame (shown in FIG. 4B).

Frame synchronization occurs when the FAS is captured with a BER less than 0.167 across the 96-bit field. Because the receiver assumes burst-mode synchronization, frame synchronization lasts for one frame only. At the end of each frame, the receiver again begins searching for the FAS.

As mentioned above, the receiver uses all three copies of the BCH-encoded FSN (FIG. 4B). A bit-by-bit vote among the three copies provides a more reliable version of the BCH codeword prior to decoding. The decoded FSN may be used by higher-layer reliability mechanisms to track individual frames.

Receiver Alignment and Channel Estimation

FIGS. 6-10 illustrate the receiver alignment and channel estimation performed by the processor in the receiver (e.g., FPGA 500 in FIG. 5). FIGS. 6A and 6B illustrate the relationship between the processor's internal clock speed and the de-serialization that can be performed in each alignment block. As explained in greater detail below, photon event information from the PMT is processed by a digital logic fabric 601 (the alignment blocks, etc.) as shown in FIG. 6A. This digital logic is clocked internally at one or more clock frequencies. Typically, the clock frequency ranges from 100-200 MHz, depending on technology and logic design. The outputs of the photon counters used to align the symbol in the alignment blocks may be sampled at a higher rate than logic's internal clock.

Figures 6A, 6B:
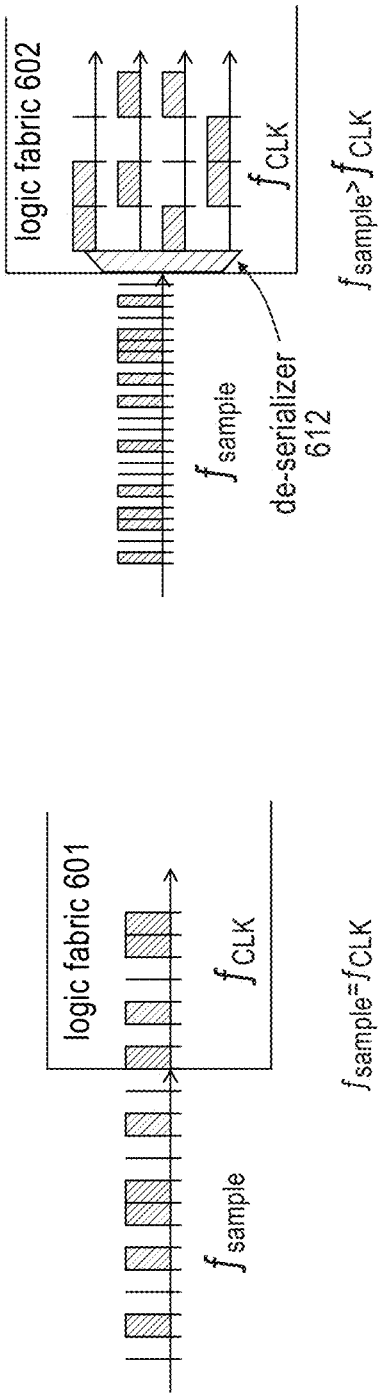
FIG. 6A shows a digital logic fabric in a receiver processor that operates at an internal clock rate equal to the sampling rate.
FIG. 6B shows a digital logic fabric with a de-serializer in a receiver processor that operates at an internal clock rate lower than the sampling rate.

FIG. 6B shows how a digital logic fabric 602 with a de-serializer 612 can perform parallelized processing of high-speed data. For instance, the alignment block 520 implementation described below operates at 250 Msamples/sec with a 1:2 de-serializer and a 125 MHz internal clock. Internal logic implements a parallelized version of serial algorithms on parallelized data stream.

Figure 7:
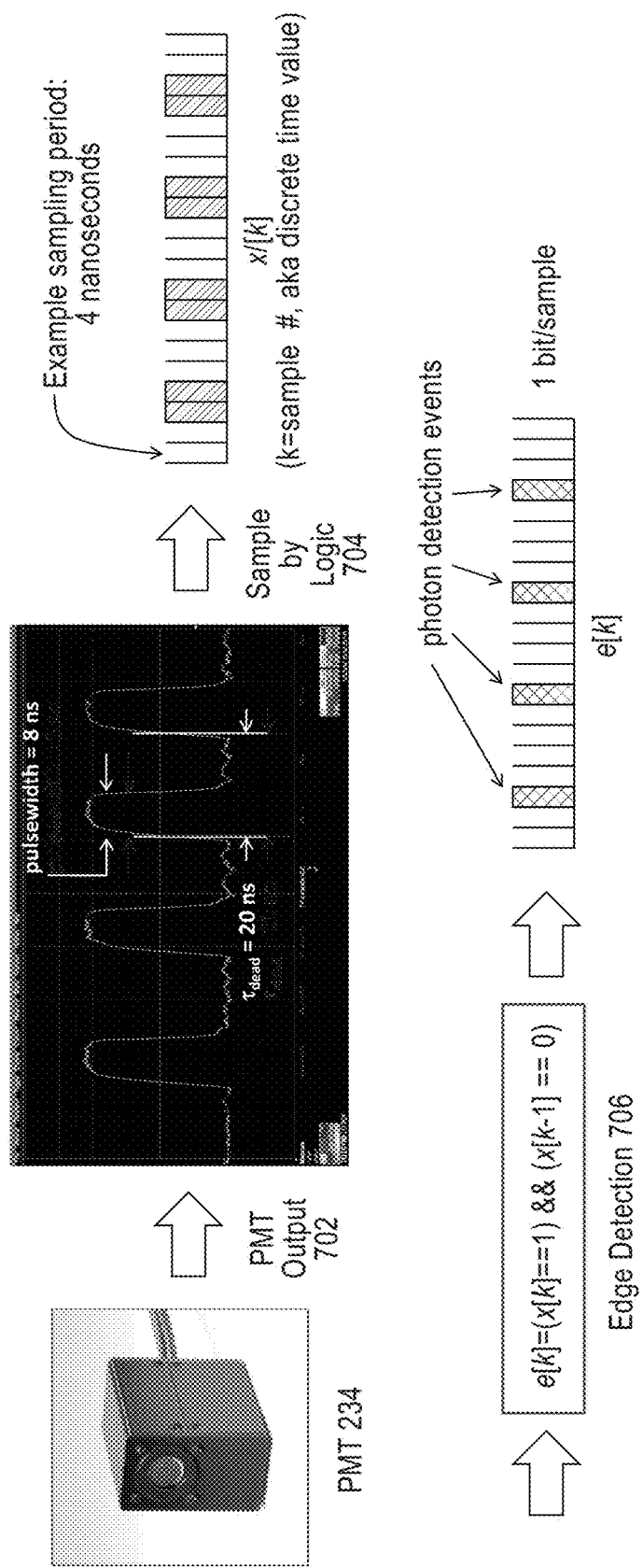
FIG. 7 illustrates an edge detection process for converting the output of a photon-counting detector, such as a PMT, into an oversampled bit stream with "1" bits representing photon detections by the photon-counting detector.

FIG. 7 illustrates a process for detecting edges in the signal generated by the PMT. As mentioned above, a photon-counting detector, such as a PMT 234, has an output 702 with a non-zero dead time. In the PMT output 702 shown in FIG. 7, for example, the dead time, or minimum between detectable photon events, is about 20 ns and the pulse width is about 8 ns. A photon counter in the processor oversamples (604) the photon-counting detector at a sampling rate whose period is likely shorter than this dead time (e.g., the sampling period may be about 4 ns). As a result, when the photon-counting detector is firing (emitting an electronic signal in response to detecting a photon), each period of the photon counter output spans multiple sampling slots.

Note that the photon-counting detector senses the edge of a detected photon, not necessarily that of a bit. Several photons may be detected during the period of one bit. Due to optical loss, the first detected photon may occur after the beginning of the symbol (e.g., if every photon transmitted in the first slot of the symbol were lost due to scattering or attenuation). Furthermore, depending on bit duration and blocking time, multiple photons may be detected sequentially during the symbol period.

A boundary detector (e.g., edge rising-edge 510) assigns each photon-counting detector firing to the first slot in which the output is high (706) to produce an output e[k] with one bit per sample. (The boundary detector may also detect falling edges or other boundaries instead of rising edges and assign each firing to the last slot in which is low.) For a single-element photon-counting detector, the edge detection data value may be binary per slot (e.g., a 0 or 1). For a multiple-element photon-counting detector, the edge detection data value may be quantized (e.g., M) per slot.

The edge detector finds photon events and generates the input to alignment block(s), which find the symbol boundaries. Generally, the more photon detections per symbol, the lower the BER. Without being bound by any particular theory, the choice of edge detection (as opposed to detecting another feature or performing a correlation) has to do with the physics of photon-counting detectors rather than the modulation scheme. Since a photon-counting detector has a blocking time, the photon-counting detector's output is higher for longer than it needs be. It's really the leading edge that announces the arrival of a photon. The modulation scheme is a higher layer than collects photon arrival times to generate information. Therefore, boundary (e.g., edge) detection is useful regardless of the modulation scheme and should work with other types of modulation, including pulse-position modulation (PPM).

Each alignment block receives a copy of the edge detection output stream e[k] in binary form or with multiple bits per sample, depending on whether the photon-counting detector has one element or multiple elements. And each alignment block can be clocked serially at the edge detection sampling rate, e.g., at a sample rate of 250 Msamples/sec (a sampling period of 4 ns). The alignment blocks' internal clock frequencies may be slower if they are used with a de-serializer as explained above with respect to FIGS. 6A and 6B.

Each alignment block outputs an estimate of each symbol boundary, an estimate of photon count per symbol during "on" time(s) of each symbol, and an estimate of the photon count per symbol during "off" time(s) of each symbol. For a symbol that is N samples long, the alignment block's symbol boundary estimate is the best sample phase modulo N as explained below. In this implementation, the alignment blocks count photons, but do not demodulate photon counts to bits.

Figure 8:
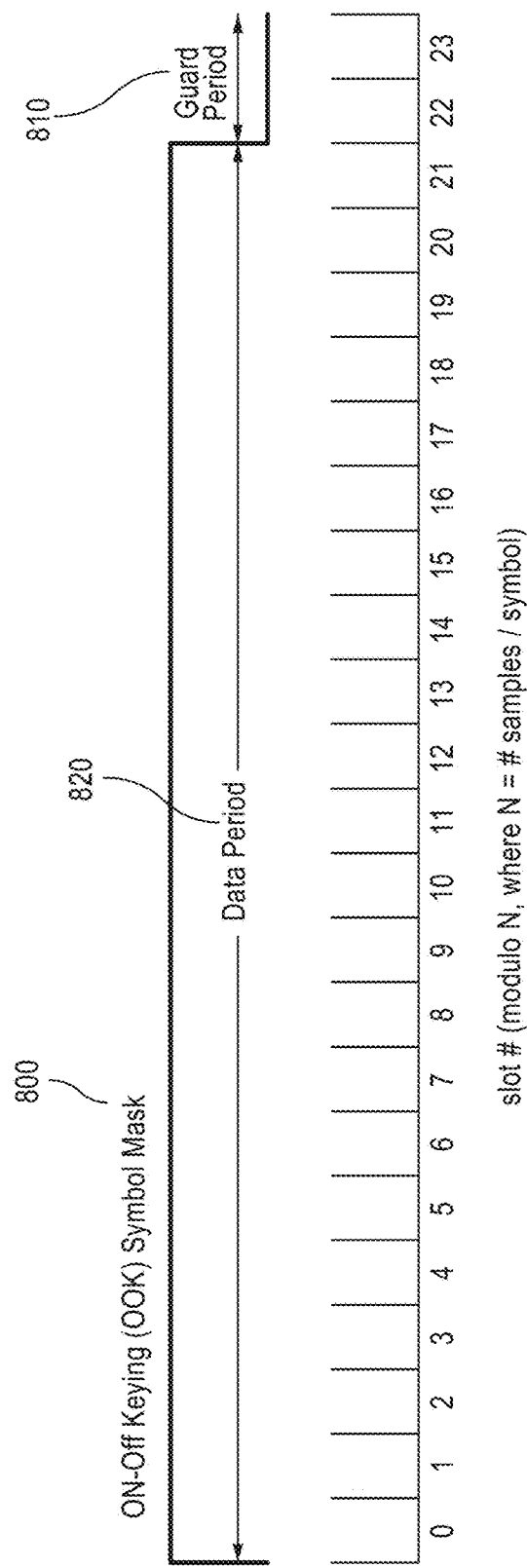
FIG. 8 shows an OOK symbol mask for use by the receiver processor in estimating the data rate of the underwater optical link.

FIG. 8 shows an OOK symbol mask 800 used by an alignment block to estimate the phase of symbols detected by the receiver. The OOK symbol mask 800 includes one slot for each sample, with slots numbered locally at the receiver. There are N slots in the mask 800, with q slots for the data period 820 and r slots for the guard period 810. The transmitter transmits light during the data period 820 but not during the guard period 810, hence the receiver expects to detect signal photons during the data period 820 but not during the guard period 810 (it may detect some stray photons, e.g., from scattering of the signal beam or from other sources, during the guard period). In this example, the receiver operates with a constant slot rate, i.e., N varies with the data rate (in FIG. 7, N=24). The duty cycle, measured as r/(q+r), is constant across the data rates in this implementation and may vary across data rates in other implementations.

Figure 9A:
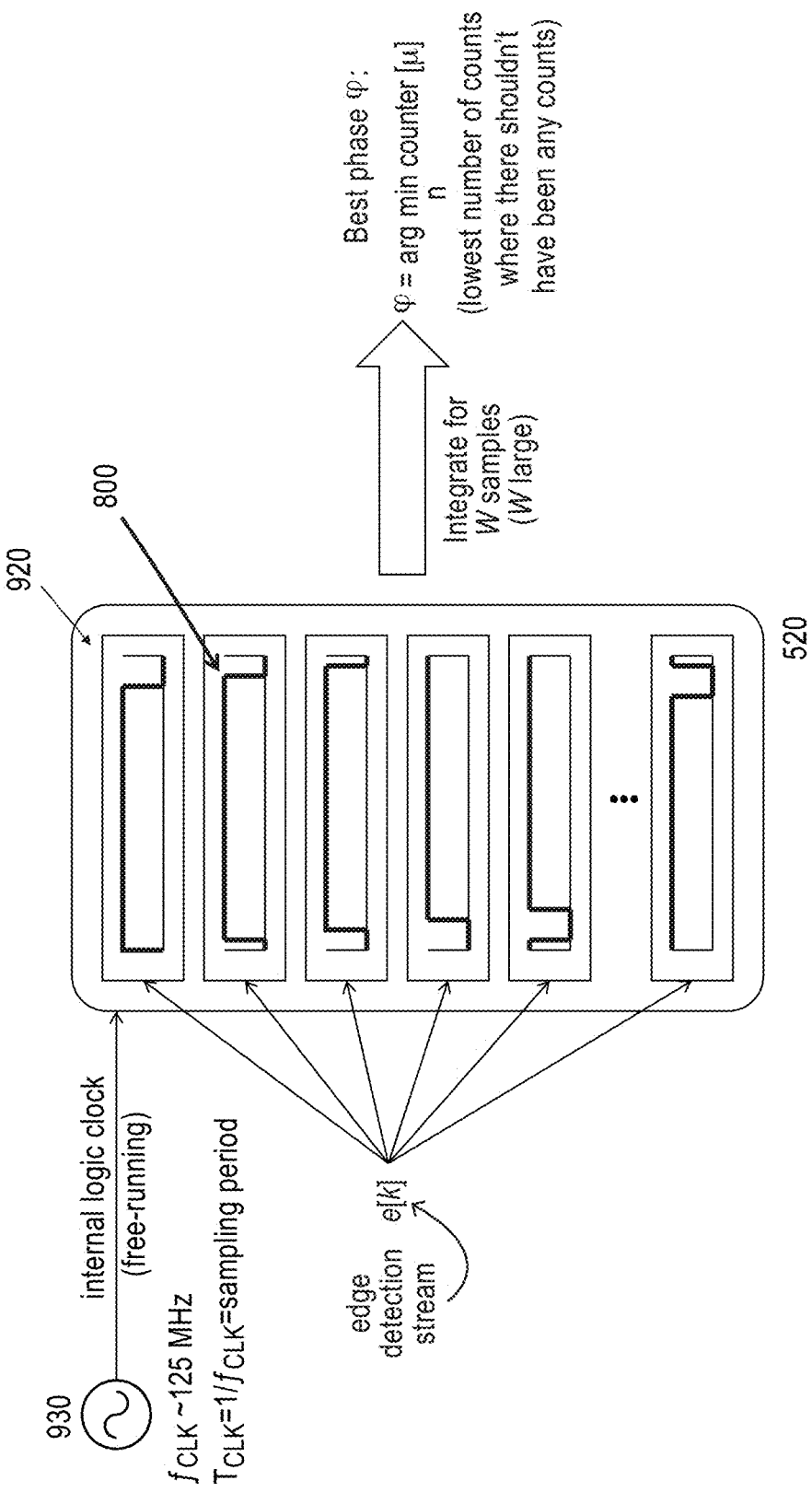
FIG. 9A shows an alignment block in the receiver processor of FIG. 5 uses the OOK symbol mask of FIG. 8 to estimate the data rate of the underwater optical link.
Figures 9B, 9C:
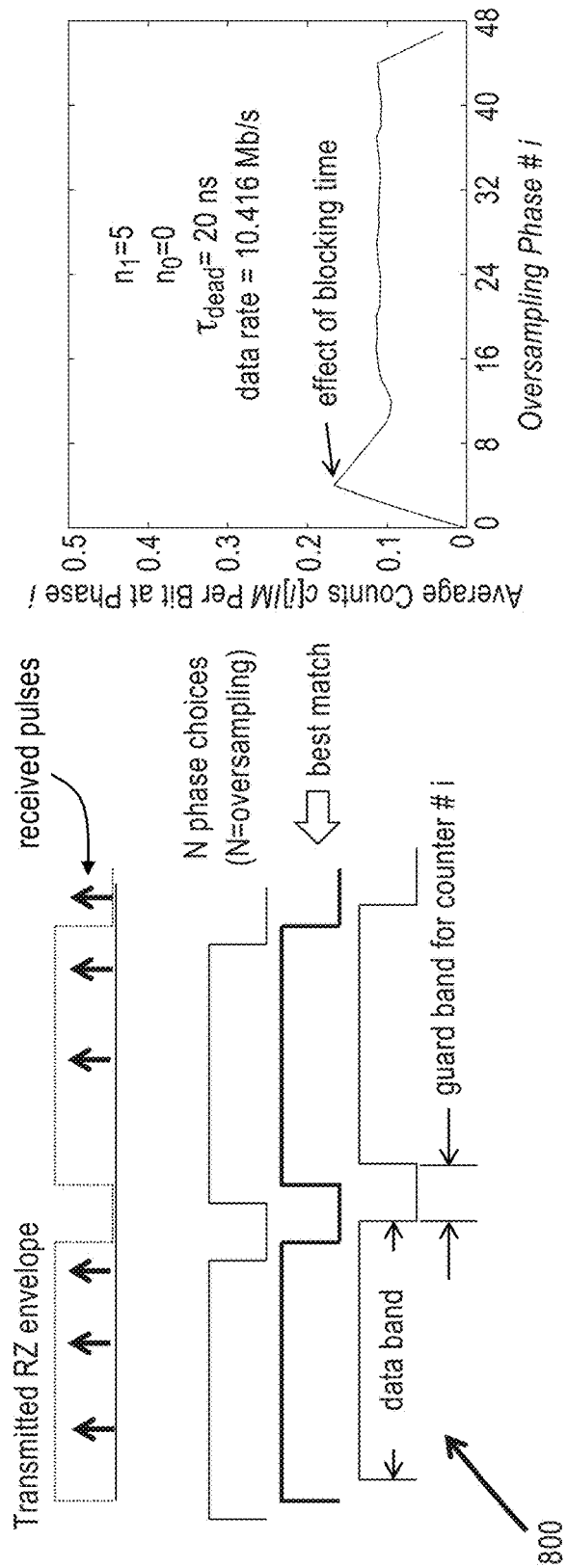
FIG. 9B shows alignment of an OOK symbol mask with detected photons and a transmitted return-to-zero (RZ) symbol envelope.
FIG. 9C is a plot of average photon counts per bit versus OOK symbol mask position/alignment.

FIGS. 9A and 9B show how an alignment block 520 uses the OOK symbol mask 800 shown in FIG. 8 to estimate the phase (alignment) of each symbol detected by the receiver. The alignment block 520 includes N integration counters 920, where N is the number of slots (samples) in the symbol and OOK symbol mask 800. Each integration counter 920 holds a circularly shifted version of the OOK symbol mask 800, which is an N-element vector with a value of 1 during the data period and a value of 0 during the guard period as explained above. The counters 920 are incremented at the frequency of the alignment block's internal clock 930, which is a factor of the sampling rate for processing de-serialized data as shown here.

In operation, each integration counter 920 receives a copy of the edge detection stream e[k] from the edge detector (FIG. 5). Because the counters 920 integrate photon counts from the edge detector, they're integrating on a slot-by-slot basis. For each integration counter, if the edge detection stream is not equal to zero during the guard period, the counter value is incremented by the value of the edge detection stream (i.e., e[k]≠0 during mask$_n$[k mod N]=0 then counter[n]=counter[n]+e[k]). Together, the integration counters integrate the edge detection stream for W samples, where W is an integer equal to the product M×N, where M is a positive integer. M may be different for each data rate, but is picked so that W is constant across all rates. For example, for 10.416 Mb/s, M=16384; for 5.208 Mb/s, M=8192; and for 1.302 Mb/s, M=2048. These particular numbers are selected so that the lowest number, 2048, is large enough so that the error bars on sampling ~sqrt(2048) are comparatively small, while the resultant 1.57 ms integration time is not too long. Also, they are all powers of two, which makes processing faster with an FPGA.

Put differently, the integration counters 920 integrate over W/N symbols. Here, W is constant for all alignment blocks. As explained above, this is where the buffer delay (implemented by FIFO buffer 522; here, 1.57 ms) originates. The alignment block 520 outputs the best phase φ, which is the count of the integration counter with the lowest number of counts:

$$\varphi = \arg\min_n \text{counter}[n]$$

The best phase represents the circularly shifted mask 800 with the lowest number of photons detected during the guard period. e[k] is the number of photon counts in slot k, The operation of the integration counters can also be expressed in terms of the number of bits accumulated during each integration period. As mentioned briefly above, the receiver processor oversamples the PMT output (e.g., at a rate of 250 MHz or 500 MHz) such that at each data rate each bit is oversampled N times. As shown in FIG. 9A, each alignment block 520 maintains N integration counters 920, one for each possible bit phase. The "off" times in the transmitted pulses (shown as the guard period 410 in FIG. 4A) provides a periodic structure that can be used for timing alignment with the OOK symbol mask 800 as shown in FIGS. 9A and 9B. Each counter 920 accumulates detected photon events that fall into the "off" time for the RZ bit at that phase. The counters 920 accumulate events for the equivalent of M bits, which again depends on the data rate for that alignment block (e.g., M may be inversely proportional to the data rate so that the integration time is fixed).

TABLE 2 shows the oversampling N and integration time M for each data rate. For the data rates in this example, the integration time NM·2 ns is a constant 1.572864 ms. In other words, the integration time equals the number of samples divided by the sample period, or M=W/2 ns in this example.

TABLE 2

Alignment parameters.

| Channel Rate (Mb/s) | N = Oversampling | M = Integration Time (bits) |
|---|---|---|
| 1.302 | 384 | 2048 |
| 5.208 | 96 | 8192 |
| 10.416 | 48 | 16384 |

FIG. 9B shows the operation of the integration counters 920 for a given data rate. A dark count in the "off" time of the second bit is shown. Any counters 920 whose "off" window overlaps with a detected photon event will accumulate that detected photon event. Assuming that $n_0 < n_1$, the best-matching phase should correspond to the counter with the smallest value after M bits of integration.

The frame length (minus the guard period) and the oversampling parameter N in TABLE 2 determine the minimum desired stability from the receiver's clock oscillator with respect to the transmitter's oscillator. In the worst case of this example, where N=384, allowing for a fast transmitter and a slow receiver (or vice versa), and allowing only 1 ns (here, half a sample period) of timing slip between transmitter and receiver over the duration of one frame, an individual oscillator should have a stability of 10 parts per billion. Fortunately, oscillators of this class are readily available at low cost, small size, and fast initialization times.

The alignment block 520 can also estimate the background light level as follows. Again, each symbol contains q slots per data period and r slots per guard period. The minimum integration counter value $$\left(\min_n \text{counter}[n]\right)$$

gives the background photon count in a single slot, and that slot is assumed to be in the guard period. To get the background photon counts $n_0$ in the data period, the alignment block multiples the background photon count for the single slot in the guard period by the number of slots in the data period, q:

$$n_0 = q \cdot \min_n \text{counter}[n]$$

The alignment block 520 can estimate the signal photon count during the data period too. Once the background light has been estimated, e[k] and $n_0$ can be used to estimate $n_1$, the average number of photons detected in the q slots of a symbol. To form this estimate, the alignment block operates under the assumption that half the incoming symbols represent "1" bits and the other half represent "0" bits. The average number of detected photon events per symbol can be calculated while accumulating events in counters as:

$$\langle e[k] \rangle = \frac{1}{W} \sum_{k=0}^{W-1} e[k]$$

The number of signal photons per data period is the product of the average number of detected photon events per symbol and twice the number of samples divided by the number of samples in the data period:

$$n_1 = \frac{2N}{q} \langle e[k] \rangle - \frac{2N-q}{q} n_0$$

If $n_0$ signal photons are detected during the guard period, then the number of signal photons per data period equals the number of signal photons per symbol.

FIG. 9C is a plot of the average number of photons per bit detected in the guard period versus the oversampling phase number (the OOK symbol mask shift). This data was generated experimentally for a data rate of 10.416 Mb/s and a guard period (dead time) of about 20 ns. The plot shows that the average number of background photons per bit across all oversampling phases is about 0.1, which rounds to zero. This average number of background photons per bit yields an average of five detected photon events per symbol.

The alignment block may periodically re-estimate the phase, background, and signal. At the end of every W samples, the alignment block's integration counters are cleared and another estimate is started. The phase, background, and signal estimations from the last integration persist during the next integration and are only updated at the end of the new integration period.

Forward Error Correction

End-to-end performance can be improved through the use of forward error correction (FEC), e.g., using the decoder 560 shown in FIG. 5, allowing less received power for the same target BER. FEC is an enabling technology in loss-limited links. Older codes such as Reed-Solomon have a relatively small footprint and high throughput. However, newer soft-decision codes based on low-density parity check codes (LDPCs) can provide performance near capacity. The input to a soft-decision FEC is a vector of log likelihood ratios (LLRs), where each LLR represents an estimate of a transmitted bit. For a given received signal $r_i$ corresponding to a transmitted bit $x_i$, its LLR is $$LLR = \ln \frac{p(x_i = 1 \mid r_i)}{p(x_i = 0 \mid r_i)}$$

Some soft-decision FECs available today allow run-time configuration of their code rate, or the fraction of transmitted bits that correspond to user data (with the remainder consisting of parity bits). Code rate can be used as an additional parameter to trade robustness vs. data rate.

For the data rates of interest here, the expense of a soft decision FEC is justifiable, given available dense programmable logic. However, in order to employ it successfully, the receiver should be able to estimate the channel's signal and noise characteristics in order to compute the LLRs.

An inventive receiver can employ any suitable FEC code, including Reed-Solomon FEC with a relatively simple decoder (e.g., decoder 560 in FIG. 5). In some implementations, the transmitter sends a value, or flag, before each block of FEC-encoded data telling the receiver what the code rate is. (The block of FEC data plus the data used to understand it is called a frame.) The receiver's FEC decoder reads this flag and uses it to estimate or determine the code rate.

For the same error correction overhead (related to the code rate), an inventive receiver can also use a better-performing option, such as a product code based on a low-density parity check (LDPC) code and a Bose-Chaudhuri-Hocquenghem (BCH) code. For instance, an inventive receiver can generate log likelihood ratios (LLRs) for use by the product code (e.g., using LLR generation block 540), yielding error-free performance even for extremely weak signals. The ability to generate LLRs for forward error correction is an improvement on previous burst-mode designs.

Furthermore, in embodiments that employ the LDPC product code, the FEC code rate can be a variable parameter. In other words, the receiver can support the ability to vary the code rate for each code block, on a frame-by-frame basis. This allows fast adaptation to changing channel conditions and differentiation of services; within the same physical stream, the receiver can receive and demultiplex several kinds of traffic with different code and data rates. For instance, some sub-streams may be high-reliability and low rate, and others may be higher throughput with less emphasis on reliability. An inventive receiver can accommodate both kinds of streams simultaneously by changing data rate and code rate.

Feed-Forward Clock Synchronization

Unlike other photon-counting links, the receiver shown in FIG. 2 employs feed-forward clock synchronization with real-time signal processing. Feed-forward synchronization allows for a compact implementation and an ability to handle arbitrary fade durations. Additionally, the feed-forward synchronization methods presented here can be used to construct a data rate detector as described in greater detail below. Prior photon-counting links are either designed for bounded fade durations or are unable to process data continuously in real time. The requirement of bounded fade durations arises in designs that employ feedback-based clock synchronization mechanisms with low loop bandwidths. In this case, the synchronization loop's time constant determines the maximum tolerable fade duration. This time constant can be increased, but at the cost of more exotic, highly-stable clock oscillators and decreased ability to track unanticipated but legitimate clock phase shifts due to terminal motion.

At least one prior receiver uses feed-forward synchronization but requires linear least squares fitting with outlier pruning to determine slot frequency and phase error and interpolation to estimate log-likelihood ratios. The relative complexity of these operations does not lend itself to real-time, continuously-running implementations. Furthermore, this prior feed-forward implementation cannot determine data rate and therefore cannot perform automatic rate detection.

Symbol synchronization is a driving requirement in this design. As already mentioned, the frequency and duration of channel disturbances in underwater links (and other links as well) is almost always unknown. Any disturbance can cause a complete loss of signal and may last for an extended period of time. It is not unreasonable to expect channel disturbances that cause outages lasting several seconds. Furthermore, it may be desirable to establish and tear down links quickly in order to save power, reduce light pollution, or address multiple communication partners quickly. A receiver capable of communicating in such an environment is fundamentally designed for burst-mode operation.

Clock sources are a fundamental component of any communication system. The underwater transmitters and receivers disclosed here can accept the clock stability of widely-available commercial clock oscillators. Such components tend to be available from multiple vendors, have small physical footprints, low power requirements, and fast start-up times. On the other hand, oscillators with higher stability may be obtainable, but from fewer vendors. They may also require thermal or other controls that are expensive, bulky, and slow to initialize. Since space in an underwater terminal may be extremely limited, so the burst-mode waveforms used in the links disclosed here can work with the realistic specifications of a small, low-power oscillator.

Experimental Results

FIGS. 10-14 show experimental results obtained using an example underwater link operating at data rates of 1.302 Mb/s, 5.208 Mb/s, and 10.416 Mb/s. These results are illustrative and should not be taken to limit the scope of the application or the appended claims.

Figure 10:
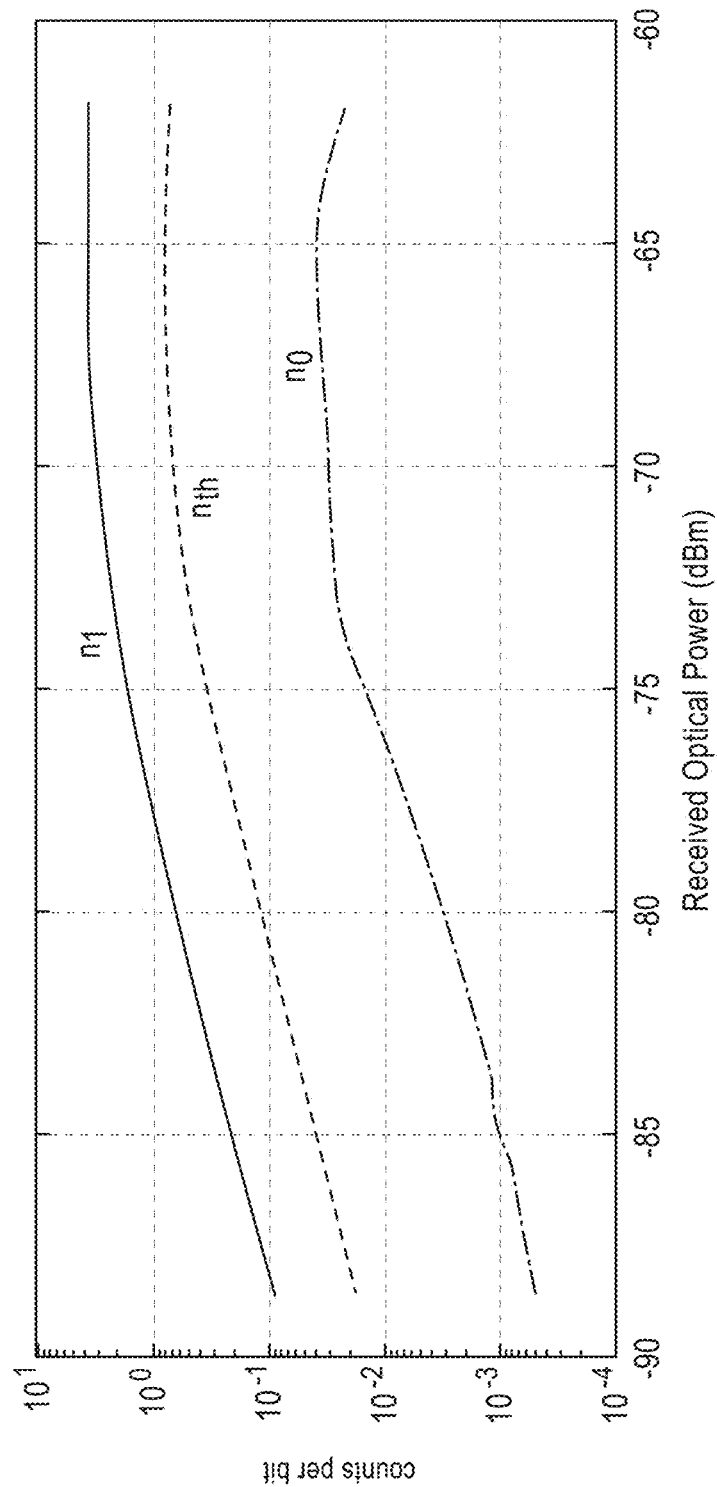
FIG. 10 is a plot of measured $n_0$, $n_1$, and $n_{th}$ at 10.416 Mb/s versus receive optical power for an underwater optical communication link like the one shown in FIG. 2.

FIG. 10 shows measured $n_0$, $n_1$, and the resulting $n_{th}$ at 10.416 Mb/s as a function of input optical power. It can be seen that the background light level rises with the signal level with nearly constant proportionality below −77 dBm. In this input power range, the ratio between the two is approximately 27 dB. This is similar to the stated transmitter extinction, indicating that background levels in this experiment are dominated by transmitter extinction. The effective extinction seen at the receiver, $n_1/n_0$, can be affected slightly by PMT saturation, since it affects $n_1$ and $n_0$ differently.

In this example, at very high input powers, measured $n_0$ decreases with received power. This behavior becomes more pronounced with increasing data rate. In that case, the "off" time of each pulse is comparable to or less than the blocking time. High input powers increase the probability of a detected photon at the end of the "on" part of a "1" bit, blocking detection of photons in the "off" part of the bit. Saturation is less pronounced at the lower data rates, since in those cases less transmitted power is required. At the lowest data rate (1.302 Mb/s), saturation effects are absent over all input powers of interest.

FIG. 10 also shows that for 10.416 Mb/s, $n_{th}$ rises with input power, but it never crosses 1. In this case, the rise of $n_{th}$ is limited by the PMT's saturation. However, for the other data rates, $n_{th}$ can assume positive integer values with sufficient input power.

Figure 11:
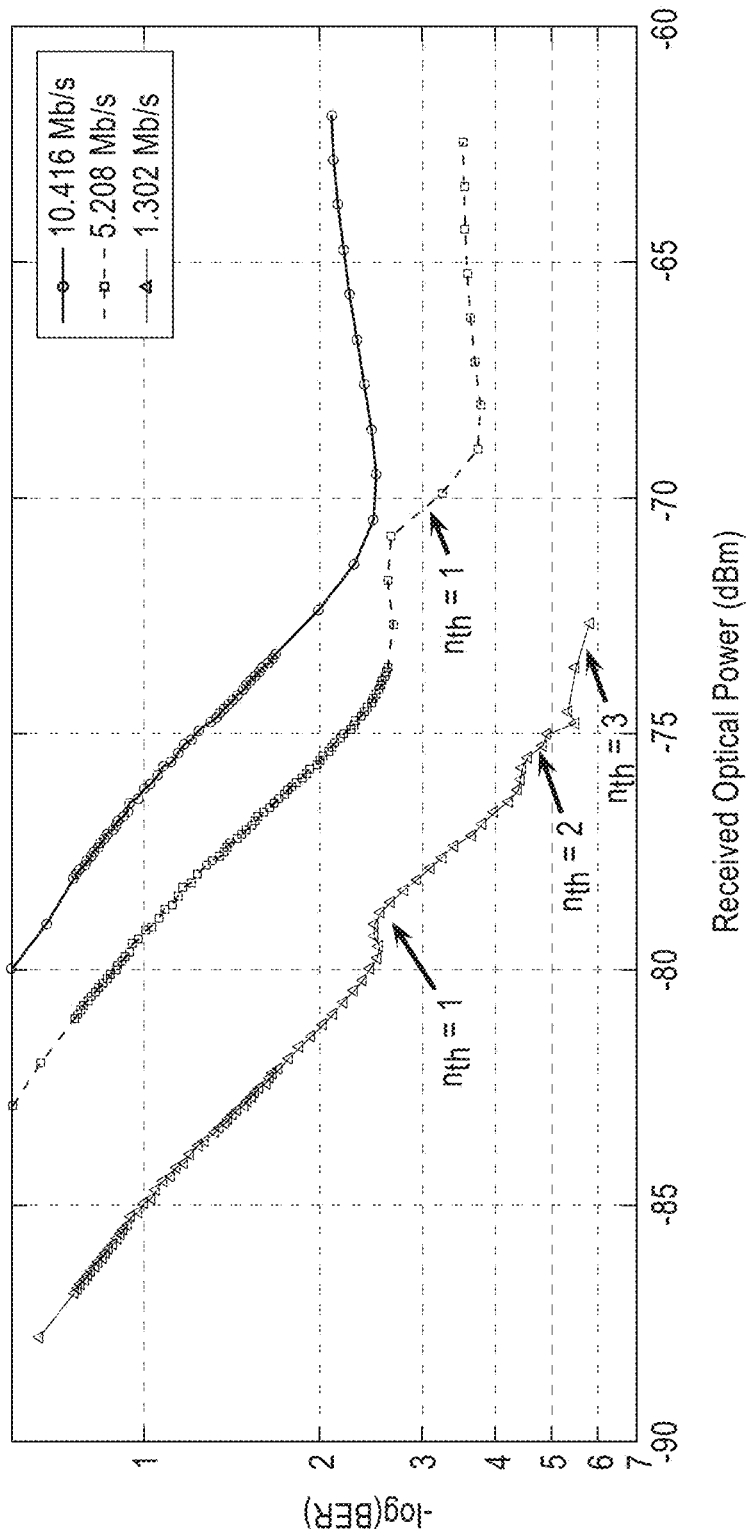
FIG. 11 is a plot of measured hard-decision BER versus input power and locations where $n_{th}$ takes a positive integral value for each data rate for an underwater optical communication link like the one shown in FIG. 2.

FIG. 11 shows the measured hard-decision BER as a function of input power and data rate. Whenever data rate was changed, it was done without warning the receiver. In all cases, the receiver quickly and successfully re-acquired the signal, which validates receiver's automatic rate detection design. The FEC decoder is able to produce error-free output for half-rate encoded input when the hard-decision BER is approximately $7 \times 10^{-2}$. The BER monotonically drops in all cases until the input power increases sufficiently. Beyond a certain point, the BER exhibits a series of step-like changes.

Figure 12:
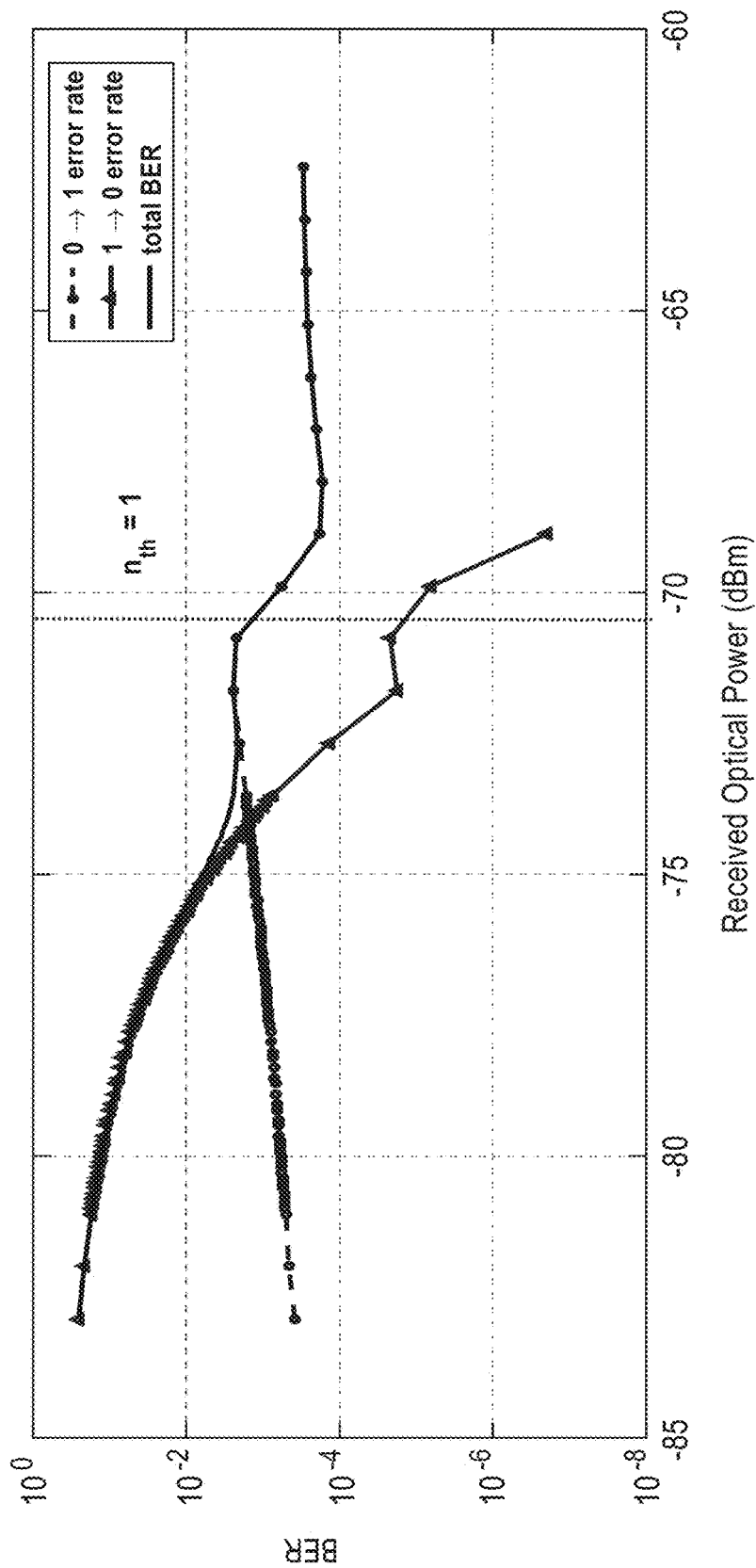
FIG. 12 is a plot of measured "0"→"1" BER and "1"→"0" BER for 5.208 Mb/s near $n_{th}=1$ for an underwater optical communication link like the one shown in FIG. 2.

FIG. 12 shows that a gradual rise in the total BER occurs when the BER is dominated by "0"→"1" errors, rather than "1"→"0" errors. The rise is mitigated when the effective threshold $n_{th}$ reaches an integral value. When the PMT saturates, $n_{th}$ cannot reach the next integral value and the BER exhibits an error floor. Saturation could be seen for 10.416 Mb/s and 5.208 Mb/s at higher powers.

Figure 13:
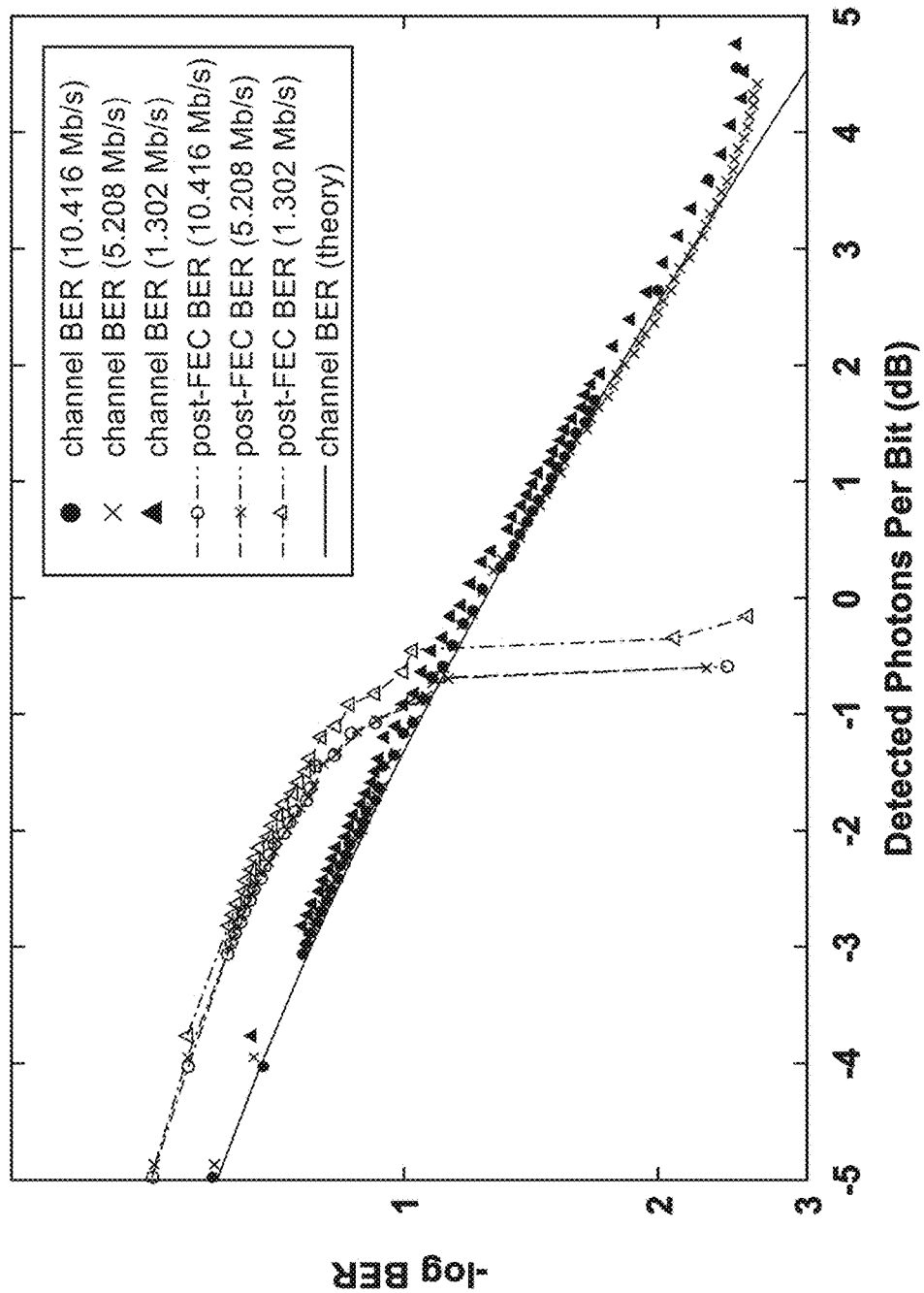
FIG. 13 is a plot of measured hard-decision and post-FEC (code rate=1/2) BER across all data rates, normalized to detected photons per bit, for an underwater optical communication link like the one shown in FIG. 2.

The performance across data rates can be compared by normalizing the input power to detected photons per bit (obtained with a measured quantum efficiency of 0.1274). FIG. 13 shows the measured hard-decision BER and post-FEC BER for all data rates where the FEC code rate is 0.5. Also shown is the expected BER, which, according to theory is:

$$BER_{theory} = \frac{1}{2} e^{-n_1}$$

This model assumes background light (i.e., $n_0$) is negligible. The channel BER at each rate agrees well with theory up to 3.5 dB photons per bit. The implementation penalty for 10.416 Mb/s and 5.208 Mb/s is ≤0.1 dB, while the penalty for 1.302 Mb/s is 0.2 dB. Beyond 3.5 dB photons per bit, the simple BER model of the equation above is inadequate to explain effects due to PMT saturation and effective-threshold changes due to non-negligible $n_0$. Fortunately, the FEC codec produces error-free output below 1 photon per bit, well before these effects take hold. The post-FEC BER vs. detected photons per bit is nearly identical between 10.416 Mb/s and 5.208 Mb/s. The increased penalty seen for 1.302 Mb/s channel BER translates to a 0.2 dB penalty for its post-FEC performance.

FIG. 13 shows that the receiver achieves near-constant efficiency in terms of BER performance vs. photons per bit across data rates, indicating that rate fallback can be achieved without additional penalty. The post-FEC BER for code rate=½ is also shown. The post-FEC BER falls off very rapidly as the input power approaches 0.5 dB photons per bit. Beyond this point, the post-FEC BER was measured to be 0 after integrating for one hour. It is evident from FIGS. 11 and 13 that strong FEC capable of operating in the low-light regime can achieve error-free communication even if the channel BER shows an error floor above $10^{-3}$ due to PMT saturation.

Figure 14:
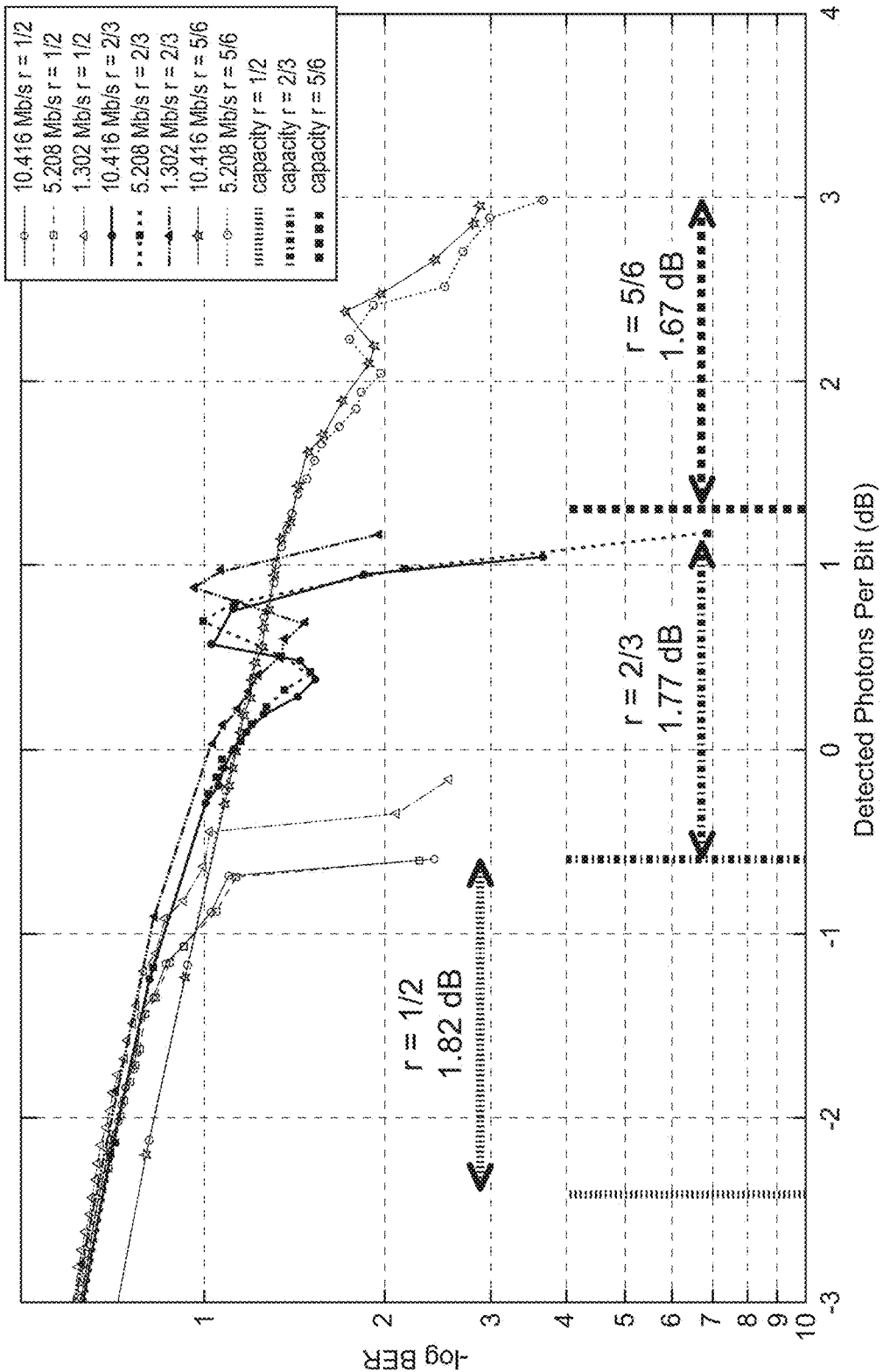
FIG. 14 is a plot of distance to capacity versus code rate (rate r=1/2, 2/3, and 5/6) and post-FEC BERs for several channel rates and code rates for an underwater optical communication link like the one shown in FIG. 2.

FIG. 14 shows the distance between measured FEC performance and soft-decision capacity for various code rates. The plot shows multiple channel data rates. Again, the performance of 10.416 Mb/s and 5.208 Mb/s is nearly identical with respect to required photons per bit, while a 0.2 dB penalty is seen for 1.302 Mb/s. Since the increased penalty for 1.302 Mb/s is believed to be caused by the hardware implementation, the distance to capacity was measured against the other data rates. The gap was found to be 1.67-1.82 dB, decreasing with increasing code rate.

For the data rates presented here, scattering-induced pulse dispersion should not introduce significant penalties. Rather, scattering can be grouped along with absorption as a loss mechanism. In this sense, the external optical attenuation used in this experiment combines with the loss in the water pipe. After coupling losses, the transmitter's average power at launch is 13 dBm. Given the sensitivities of the receiver for the presented data rates and ½-rate FEC, this allows for a maximum link loss of 88.3 dB for 10.416 Mb/s to 97.1 dB for 1.302 Mb/s. For a green-wavelength link in clear ocean water, this equates to link distances up to 148 meters. For blue-wavelength links, the PMT's quantum efficiency increases. The improved quantum efficiency would allow a maximum link loss of 98.4 dB. Furthermore, as TABLE 1 indicates, propagation losses should be lower for $\lambda=470$ nm. When both effects are considered, a blue-wavelength link in clear ocean water should be capable of distances up to 450 meters.

Wide variability in water conditions (both from location to location and over time in a single location) will require high dynamic range, for which photon counting can be beneficial. The burst-mode nature of the burst-mode, photon-counting receiver allows for a small-sized implementation that can handle channel outages of unpredictable duration. This burst-mode receiver also detects the incoming data rate automatically, removing the need for a reliable out-of-band management link. In one example, the receiver estimates the channel conditions every 1.6 ms, adapting to changes in signal strength and background light. The receiver achieves near-theoretical performance (<0.2 dB penalty) across 1.302 Mb/s, 5.208 Mb/s, and 10.416 Mb/s. The receiver includes LDPC-based, soft-decision forward error correction to provide error-free communication when the channel BER is as high as $7\times10^{-2}$. This allows robust transmission at rates suitable for several applications, including compressed high-definition video, while allowing for efficient rate fallback across 12.5 dB (i.e., almost three extinction lengths) of dynamic range.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using $n_o$ more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with $n_0$ A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical receiver comprising:
    a photon-counting detector to transduce an optical signal into a digital signal including a symbol having a data period and a guard period, the optical signal having a variable data rate;
    a boundary detector, operably coupled to the photon-counting detector, to sense a boundary of the digital signal, the boundary indicating a photon arrival at the photon-counting detector;
    at least one alignment block, operably coupled to the boundary detector, to estimate a number of photons detected by the photon-counting detector during the guard period at each of a plurality of predetermined data rates based on the boundary of the digital symbol; and
    a rate decision block, operably coupled to the at least one alignment block, to estimate the variable data rate of the optical signal based on the number of photons detected by the photon-counting detector during the guard period at each of the plurality of predetermined data rates,
    wherein the at least one alignment block is configured to estimate a number of signal photon arrivals during the data period and a number of noise photons arrivals during the guard period, and
    wherein the optical receiver is further configured to identify a symbol in the digital signal based at least in part on the number of signal photon arrivals and the number of noise photons arrivals.

2. The optical receiver of claim 1, wherein the photon-counting detector is configured to receive the optical signal via a turbid underwater channel.

3. The optical receiver of claim 1, wherein the photon-counting detector is configured to sample the optical signal at a rate greater than a reciprocal of a duration of the guard period.

4. The optical receiver of claim 3, wherein the photon-counting detector has a reset period less than the duration of the guard period.

5. The optical receiver of claim 1, wherein the rate decision block is configured to estimate one of the plurality of predetermined data rates as the variable data rate.

6. The optical receiver of claim 1, wherein the rate decision block is configured to estimate the variable data rate of the optical signal for each symbol in the digital signal.

7. The optical receiver of claim 1, further comprising:
    a log-likelihood ratio block, operably coupled to the rate decision block, to compute a log-likelihood ratio based on the boundary of the digital symbol.

8. The optical receiver of claim 1, further comprising:
    a delay block, operably coupled to the photon-counting detector, to delay a copy of the symbol; and
    a decoder, operably coupled to the delay block and the rate decision block, to decode the copy of the symbol at the variable data rate estimated by the rate decision block.

9. The optical receiver of claim 8, wherein the decoder is further configured to estimate a forward error correction (FEC) code rate of the digital signal.

10. A method of free-space optical communication, the method comprising:
    transducing, with a photon-counting detector, a free-space optical signal into a digital signal, the optical signal having a variable data rate;
    sensing a boundary of the digital signal, the boundary indicating a photon arrival at the photon-counting detector;
    estimating a number of photons detected by the photon-counting detector during the guard period at each of a plurality of predetermined data rates based on the boundary of the digital symbol;

estimating the variable data rate of the optical signal based on the number of photons detected by the photon-counting detector during the guard period at each of the plurality of predetermined data rates;

estimating a number of signal photon arrivals during the data period and a number of noise photons arrivals during the guard period; and identifying a symbol in the digital signal based at least in part on the number of signal photon arrivals and the number of noise photons arrivals.

11. The method of claim 10, further comprising:

receiving the free-space optical signal at the photon-counting detector via a turbid underwater channel.

12. The method of claim 10, wherein transducing the free-space optical signal into a digital signal comprises sampling the optical signal at a period less than a duration of the guard period.

13. The method of claim 12, further comprising:
resetting the photon-counting detector in a period less than the duration of the guard period.

14. The method of claim 10, wherein estimating the variable data rate of the optical signal comprises identifying one of the plurality of predetermined data rates as the variable data rate.

15. The method of claim 10, further comprising:
estimating the variable data rate of the optical signal for each symbol in the digital signal.

16. The method of claim 10, further comprising:
estimating a log-likelihood ratio based on the boundary of the digital symbol.

17. The method of claim 10, further comprising:
decoding a copy of the symbol at the variable data rate estimated by the rate decision block.

18. The method of claim 17, further comprising:
estimating a forward error correction (FEC) code rate of the digital signal.

* * * * *